(12) United States Patent
Goyal et al.

(10) Patent No.: US 11,853,069 B2
(45) Date of Patent: Dec. 26, 2023

(54) CONTINUING LANE DRIVING PREDICTION

(71) Applicant: Waymo LLC, Mountain View, CA (US)

(72) Inventors: Vishu Goyal, Sunnyvale, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 173 days.

(21) Appl. No.: 17/199,948

(22) Filed: Mar. 12, 2021

(65) Prior Publication Data
US 2022/0291690 A1    Sep. 15, 2022

(51) Int. Cl.
*G05D 1/02* (2020.01)
*G05B 13/04* (2006.01)
*B60W 60/00* (2020.01)
*G05B 13/02* (2006.01)

(52) U.S. Cl.
CPC ......... *G05D 1/0214* (2013.01); *B60W 60/001* (2020.02); *G05B 13/0265* (2013.01); *G05B 13/048* (2013.01); *B60W 2552/05* (2020.02); *B60W 2552/15* (2020.02); *B60W 2552/20* (2020.02); *B60W 2552/30* (2020.02); *B60W 2554/4029* (2020.02); *B60W 2554/4041* (2020.02); *B60W 2554/4042* (2020.02); *B60W 2554/4043* (2020.02); *B60W 2554/4045* (2020.02); *B60W 2554/4046* (2020.02); *B60W 2555/60* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 7,218,207 | B2 | 5/2007 | Iwano |
| 9,547,307 | B1 | 1/2017 | Cullinane et al. |
| 10,259,459 | B2 | 4/2019 | Takae |
| 10,261,512 | B1 | 4/2019 | Cullinane et al. |

(Continued)

OTHER PUBLICATIONS

Cao, Xiaoying, et al., A study of mandatory lane-changing execution behaviour model considering conflicts, Australasian Transport Research Forum 2016 Proceedings, pp. 1-16, 2016.

(Continued)

*Primary Examiner* — David P. Merlino
(74) *Attorney, Agent, or Firm* — Botus Churchill IP Law LLP

(57) ABSTRACT

The technology relates to controlling a vehicle in an autonomous driving mode in accordance with behavior predictions for other road users in the vehicle's vicinity. In particular, the vehicle's onboard computing system may predict whether another road user will perform a "continuing" lane driving operation, such as going straight in a turn-only lane. Sensor data from detected/observed objects in the vehicle's nearby environment may be evaluated in view of one or more possible behaviors for different types of objects. In addition, roadway features, in particular whether lane segments are connected in a roadgraph, are also evaluated to determine probabilities of whether other road users may make an improper continuing lane driving operation. This is used to generate more accurate behavior predictions, which the vehicle can use to take alternative (e.g., corrective) driving actions.

21 Claims, 19 Drawing Sheets

(56) References Cited

U.S. PATENT DOCUMENTS

| | | | |
|---|---|---|---|
| 10,691,125 B2 | 6/2020 | Hashimoto et al. | |
| 2018/0033296 A1 | 2/2018 | Fowe | |
| 2019/0329777 A1 | 10/2019 | Rajab et al. | |
| 2020/0047750 A1 | 2/2020 | Likhachev et al. | |
| 2021/0019376 A1* | 1/2021 | Neubauer | G08G 1/0129 |
| 2021/0094558 A1* | 4/2021 | Garcia | G06V 20/584 |
| 2021/0272018 A1* | 9/2021 | Casas | G06N 20/00 |
| 2022/0048503 A1* | 2/2022 | Khandelwal | G06V 20/56 |
| 2022/0063674 A1* | 3/2022 | De Francesco | G05D 1/0227 |

OTHER PUBLICATIONS

Erdmann, Jakob, Lane-Changing Model in SUMO, German Aerospace Center, 2020, pp. 1-12.
Esterle, Klemens, et al., Modeling and Testing Multi-Agent Traffic Rules within Interactive Behavior Planning, arXiv:2009.14186v1, 2020, pp. 1-6.
Lopez, David Perdomo, et al., Scenario Interpretation based on Primary Situations for Automatic Turning at Urban Intersections, VEHITS 2017, 3rd Conference on Vehicle Technology and Intelligent Transport Systems, pp. 15-23, 2017.
Vaughan, Christopher, et al., The Effects of Late Lane Merges on Travel Time, Research & Development, NCDOT, 2018, pp. 1-67.
Zhang, Junyou, et al., Study on Driving Decision-Making Mechanism of Autonomous Vehicle Based on an Optimized Support Vector Machine Regression, Applied Sciences, 2018, MDPI, pp. 1-18.

\* cited by examiner

140

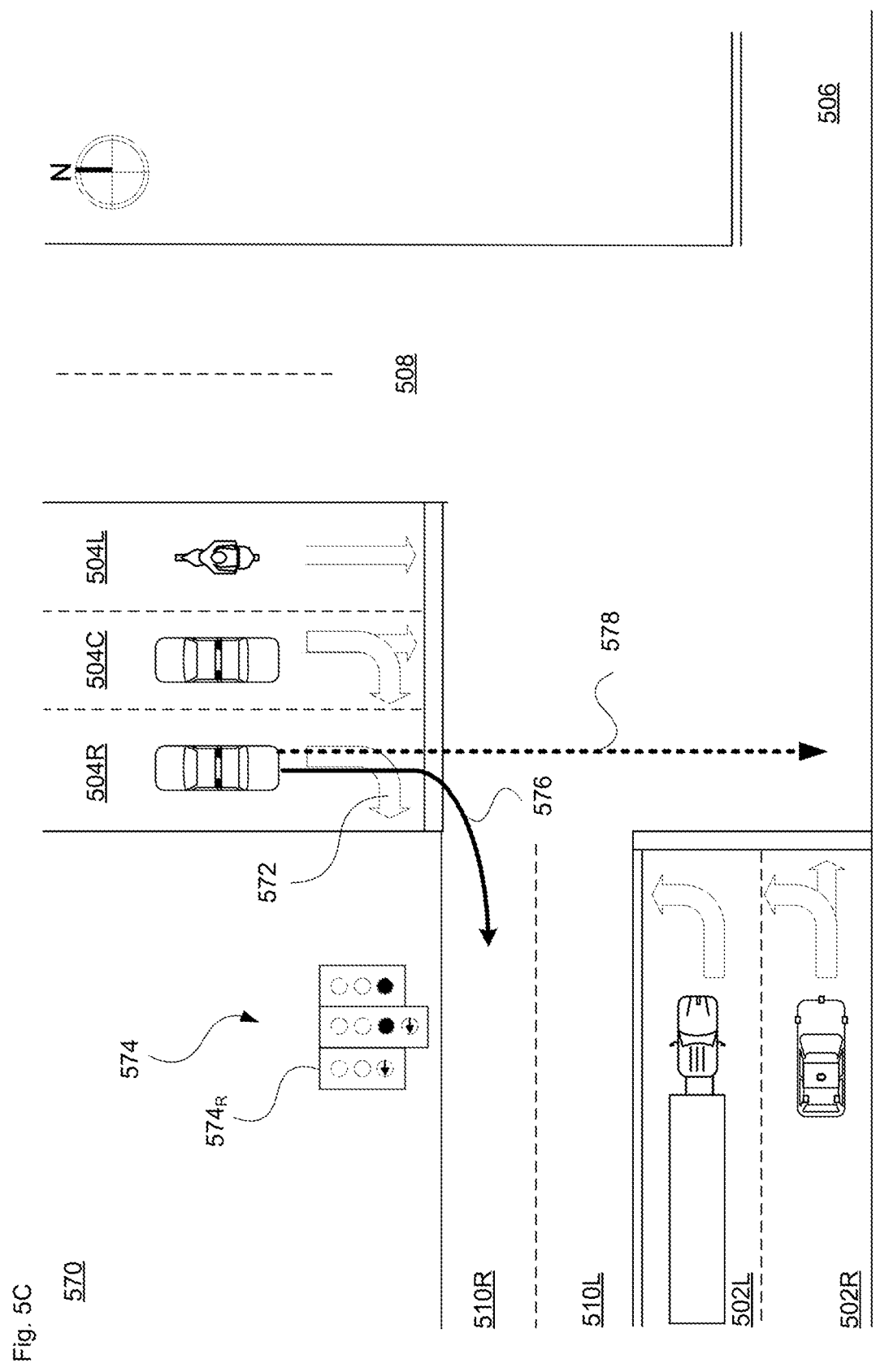

700

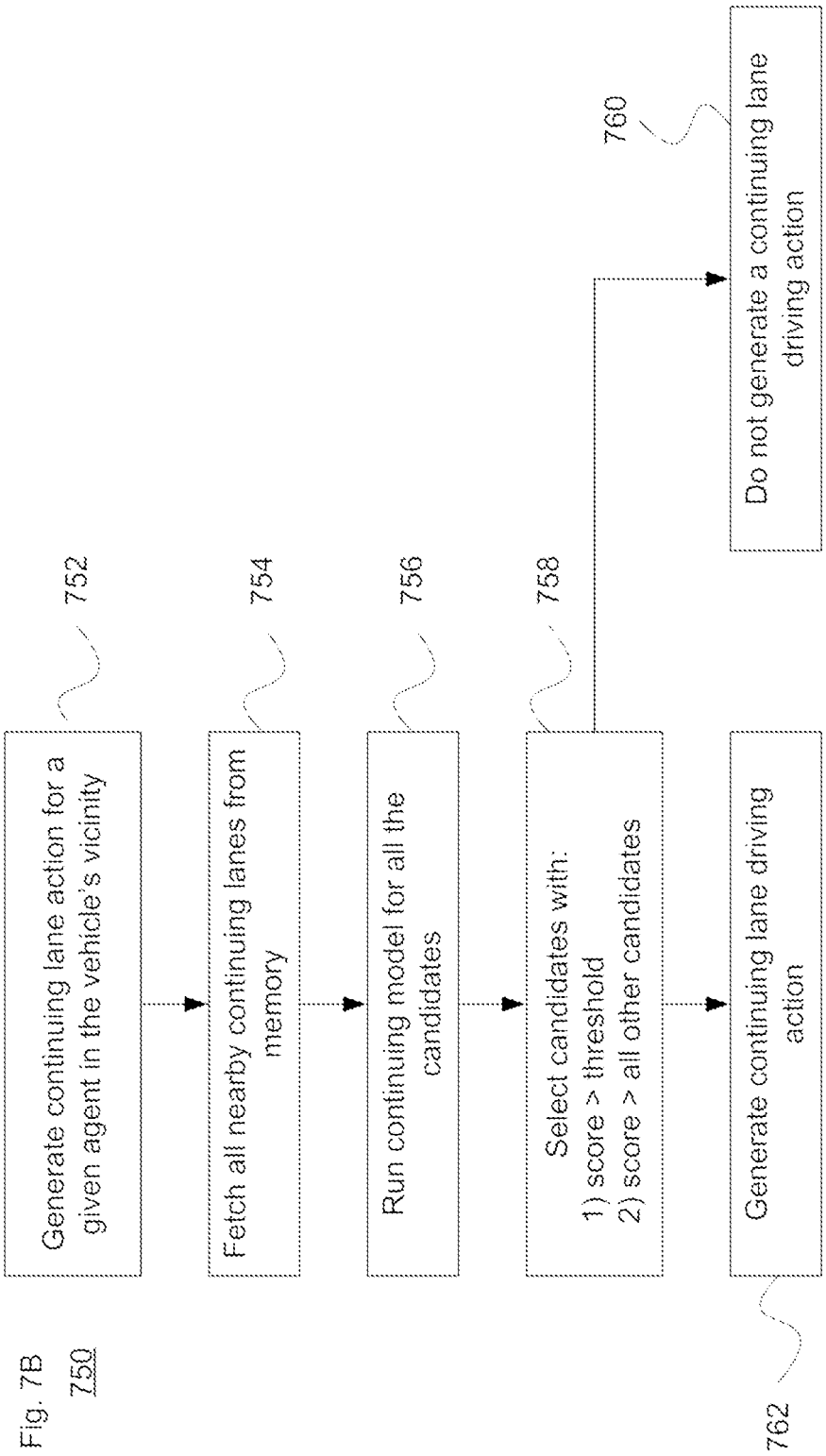

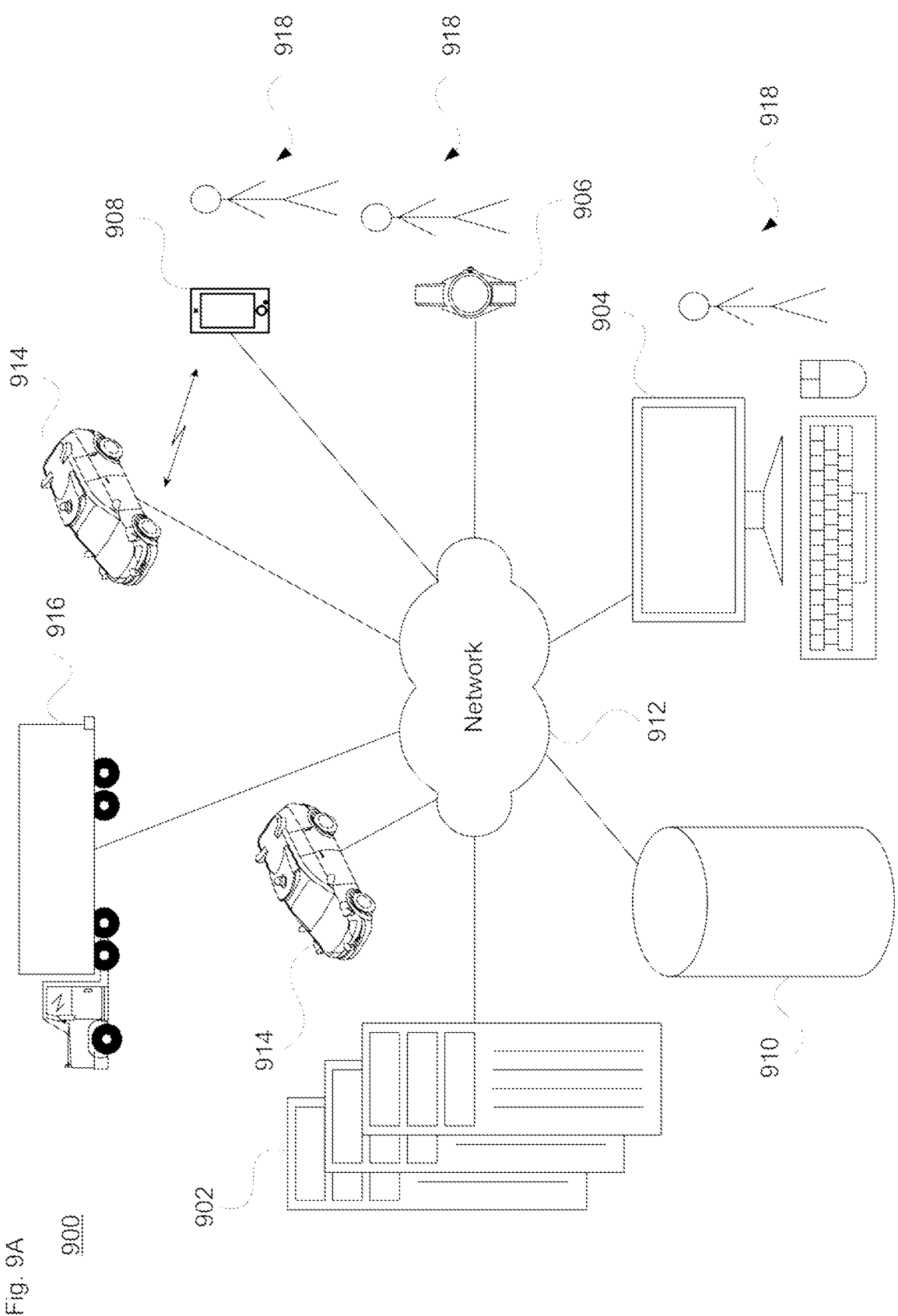

CONTINUING LANE DRIVING PREDICTION

BACKGROUND

Vehicles that operate in an autonomous driving mode may transport passengers or items such as cargo from one location to another. Such vehicles are typically equipped with various types of sensors in order to detect objects in the surroundings. For example, self-driving vehicles may include lasers (lidars), radar, cameras, and other devices which obtain sensor data (e.g., point cloud data or images) from the vehicle's surroundings. Sensor data from one or more of these devices may be used to detect objects and their respective characteristics (e.g., position, shape, heading, speed, etc.). These characteristics can be used to predict what an object is likely to do for some brief period of time in the immediate future.

The predictions can aid in controlling the vehicle in order to avoid these objects. Thus, detection, identification, and prediction are critical functions for the safe operation of autonomous vehicle. However, it can be very challenging to predict when another road user or other agent such as a pedestrian may not follow the rules of the road. Therefore, it is difficult for the autonomous vehicle to plan for alternative driving operations.

BRIEF SUMMARY

The technology relates to controlling a vehicle in an autonomous driving mode in accordance with behavior predictions for other road users in the vehicle's vicinity. For instance, such autonomous vehicles operate by detecting and identifying objects in the vehicle's nearby environment and reacting to those objects, for instance by changing lanes, speeding up or slowing down. In order to control the vehicle safely, the vehicle's computing devices should be able to predict what other road users are likely to do in the near future, such as over the next 5-10 seconds (or more or less). This can include determining the likelihoods that another object will take different actions, even if those actions are atypical or violate the rules of the road. For instance, a pedestrian may jaywalk or a car may run a red light.

One particular situation of interest involves "continuing" lane driving. For instance, a motorcycle may be in a left turn only lane, but ends up driving straight along its prior trajectory instead of making the turn. Predicting a likelihood of and the geometry for continuing lane driving can be very beneficial for autonomous vehicle operation, including avoiding rapid changes in acceleration ("jerk") due to braking to avoid the other vehicle.

According to one aspect, a method of operating a vehicle in an autonomous driving mode is provided. The method comprises identifying, by one or more processors, a source lane along a roadway, the source lane being associated with a road user other than the vehicle; identifying, by the one or more processors according to a first trained machine learning model, a target continuing lane, the target continuing lane being an impermissible lane that the road user may move toward; receiving, by one or more sensors of a perception system of the vehicle, sensor data associated with objects in an external environment of the vehicle including the road user; generating, by the one or more processors according to a second trained machine learning model and the received sensor data, a continuing lane driving behavior prediction for the road user along the continuing lane; and controlling, by the one more processors, the vehicle in the autonomous driving mode based on the continuing lane driving behavior prediction.

In one example, identifying the source lane includes fetching map information within a curtain radius of a current location of the vehicle. Alternatively or additionally, identifying the target continuing lane includes identifying a set of possible driving locations exiting from the source lane.

In another example, prior to controlling the vehicle, the method further includes generating a motion plan for the vehicle based at least in part on the continuing lane driving behavior prediction. The method may further comprise, prior to controlling the vehicle, assigning a likelihood to the continuing lane driving behavior prediction. This approach may also include generating one or more continuing lane driving behavior predictions based on the assigned likelihood of the continuing lane driving behavior prediction.

The target continuing lane may either (i) continue straight from designated a turn-only lane, or (ii) make a turn from a lane that is designated to continue straight only.

In an example, identifying the target continuing lane includes: identifying any candidate continuing lanes; evaluating all candidate continuing lanes by the first trained machine learning model to identify a score for each candidate continuing lane; and evaluating whether the score for a given one of the candidate continuing lanes exceeds a threshold and is higher than the scores for all other candidate continuing lanes. Here, when the score for the given candidate continuing lane exceeds the threshold and is higher than the scores for all other candidate continuing lanes, the method may include identifying the given candidate continuing lane as the target continuing lane. Alternatively or additionally when the score for the given candidate continuing lane does not exceed the threshold or is not higher than the scores for all other candidate continuing lanes, the method may not identify the given candidate continuing lane as the target continuing lane.

In a further example, the first trained machine learning model is trained according to one or more source lane features and one or more target lane features. Here, the one or more source lane features and the one or more target lane features may each include at least one of a lane heading, a speed limit, lane curvature, lane incline, lane camber, signage, a traffic light, or an exit point. The first trained machine learning model may be further trained according to one or additional features associated with both a source lane and a target lane. The one or more additional features may include at least one of a heading difference between the source lane and the target lane, a distance between the source lane and the target lane, or a lateral distance between the source lane and the target lane.

In yet another example, generating the continuing lane driving behavior prediction includes: running the second trained machine learning model for each candidate continuing lane to identify all candidate continuing lane actions for the road user; evaluating all candidate continuing lane actions to identify a score for each candidate continuing lane action; and evaluating whether the score for a given one of the candidate continuing lane actions exceeds a threshold and is higher than the scores for all other candidate continuing lane actions.

When the score for the given candidate continuing lane action exceeds the threshold and is higher than the scores for all other candidate continuing lane actions, the method may include generating the continuing lane driving behavior prediction according to the given candidate continuing lane action. Alternatively or additionally, when the score for the given candidate continuing lane action does not exceed the threshold or is not higher than the scores for all other candidate continuing lane actions, the method may not generate the continuing lane driving behavior prediction according to the given candidate continuing lane action In another example, the second trained machine learning model is trained according to one or more lane features and one or more agent features. Here, the one or more agent features are associated with the road user. Here, the one or more lane features may include at least one of a lane heading, a speed limit, lane curvature, lane incline, lane camber, signage, a traffic light, or an exit point; and the one or more agent features may include at least one of an agent history, a current location, speed, acceleration, heading, use of a turn signal or use of a hazard signal. The second trained machine learning model may be further trained according to one or additional features associated with both the lane features and the agent features. And the one or more additional features may include at least one of a distance between the current location of the road user and the lane, or a difference between the heading of the road user and the heading of the lane.

BRIEF DESCRIPTION OF THE DRAWINGS

FIGS. 5A-C illustrate continuing lane driving scenarios in accordance with aspects of the technology.

FIGS. 7A-B illustrate aspects of the process of FIG. 6 in accordance with aspects of the technology.

FIGS. 9A-B illustrate an example system in accordance with aspects of the technology.

DETAILED DESCRIPTION

Overview

Figure 1A:
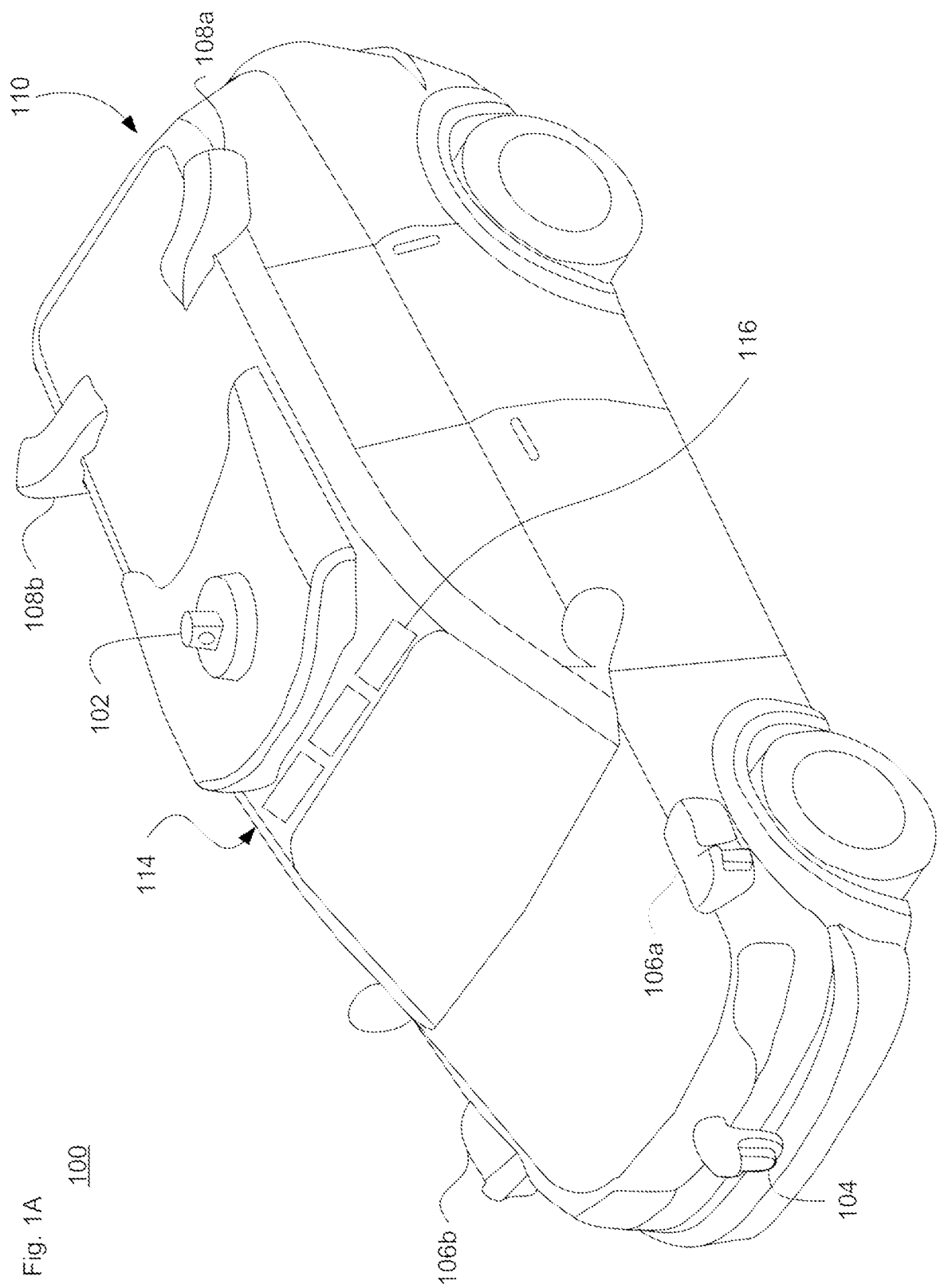
FIGS. 1A-B illustrate example autonomous passenger vehicles in accordance with aspects of the technology.

Identifying unpermitted continuing lane driving likelihoods is a challenging problem in behavior prediction, as it not only involves the prediction of whether the other road user would go from a turn only lane to a driving straight lane, but also involves identifying the target lane(s) the other road user can go to. Improper continuing lane driving (that is not consistent with the rules of the road) can involve a road user such as a cyclist or a vehicle (e.g., a motorcyclist, car, truck, bus, emergency vehicle etc.) that continues straight from a turn-only lane, and a map (e.g., a roadgraph) does not connect the turn only lane (e.g., the source lane) with the lane the other road user goes to (e.g., the target lane). The destination lane is called the continuing lane and the behavior is called continuing lane driving. Since the roadgraph does not connect the turn only (source) lane with the continuing (target) lane, this type of behavior is considered improper to perform.

One approach towards addressing this problem can involve the use of heuristics, e.g., the other object(s) heading and speed, road properties, etc. This approach could work in many cases but has certain limitations, including that heuristics are brittle and are often based on a small dataset, there is low precision/recall, the geolocation is overfitted, and delays in predictions. Examples of road properties can include lane heading, lane speed limits, traffic signals, stop or yield signs, the lane's entry and exit points, etc. Brittleness here means that the heuristics are overfitted to specific use cases and are not able to handle cases with even slight variations from them. Precision/recall here refers to the precision and recall of the heuristics to predict that the cyclist, vehicle or other road user is going to follow the continuing lane. Overfitting to geolocations means that the heuristics would be overfitted to regions in which autonomous vehicles drive and see bugs or other spurious input.

In contrast to a heuristic approach, machine learning models are more generalized and can be used for any location/region. According to aspects of the technology, a machine learning approach is employed in order to improve the predictions and generate better behavior predictions for continuing lane driving situations. The system employs one or more machine learning models that determine whether a given lane is a continuing lane for a turn, or a shared turn lane, in other words determine whether a lane is the target lane for a turn only lane or a shared turn lane. The machine learning model(s) also determine whether the other road user is moving, or intends to move, to the continuing lane from turn-only lane. This approach is beneficial for several reasons including (i) high precision/recall (higher accuracy), (ii) it provides a generalized solution application for various geolocations, (iii) it gives early predictions even before reaching the intersection (e.g., by evaluating earlier behaviors before getting to the intersection; considering the actions of similar road users at the intersection; analyzing the traffic light state; and/or looking at road user behavior at different geographic locations), and (iv) the ease of maintainability and scaling, with the ability to evaluate a massive amounts of data (e.g., years' worth of data).

Example Vehicle Systems

The technology may be employed in all manner of self-driving vehicles, including vehicles that transport passengers or items such as food deliveries, packages, cargo, etc. While certain aspects of the disclosure may be particularly useful in connection with specific types of vehicles, the vehicle may be different types of vehicle including, but not limited to, cars, vans, motorcycles, cargo vehicles, buses, recreational vehicles, emergency vehicles, construction equipment, etc.

Figure 1B:
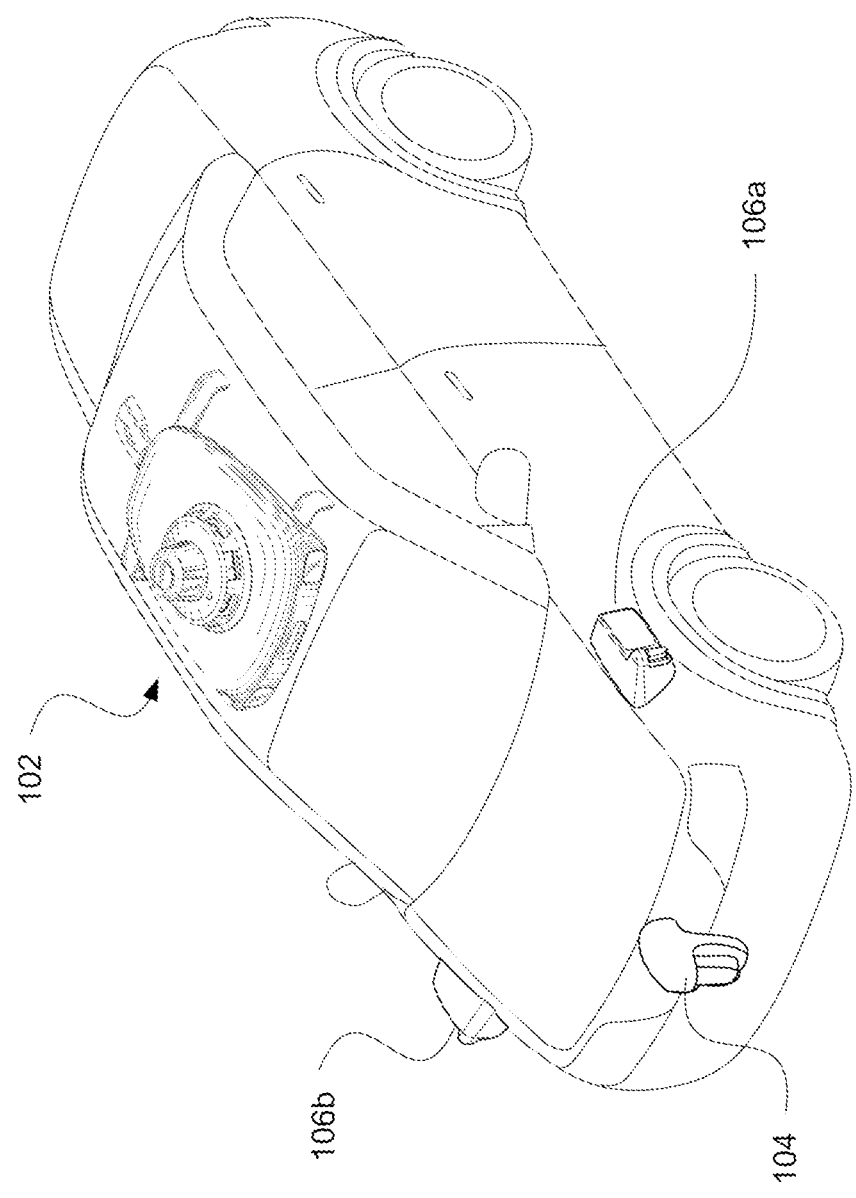

FIG. 1A illustrates a perspective view of an example passenger vehicle 100, such as a minivan or sport utility vehicle (SUV). FIG. 1B illustrates a perspective view of another example passenger vehicle 140, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 140 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

Figure 1C:
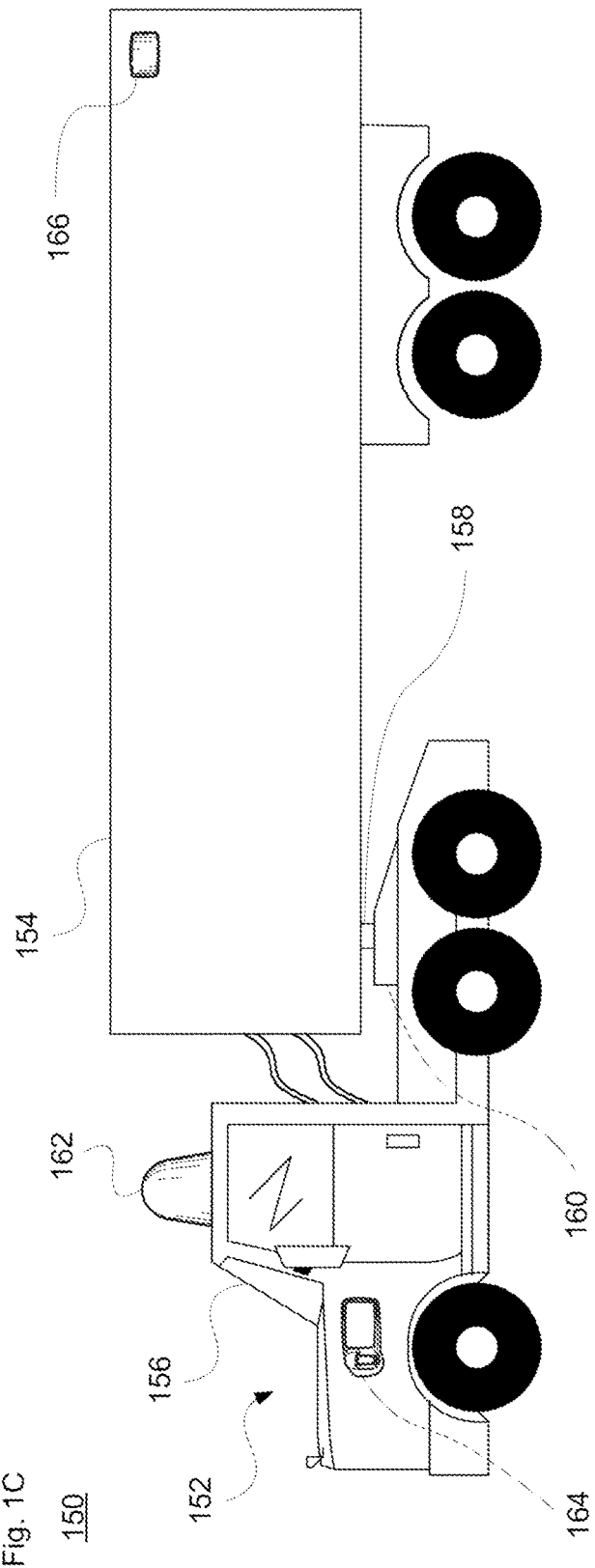
FIGS. 1C-D illustrate an example autonomous cargo-type vehicle configured for use with aspects of the technology.
Figure 1D:
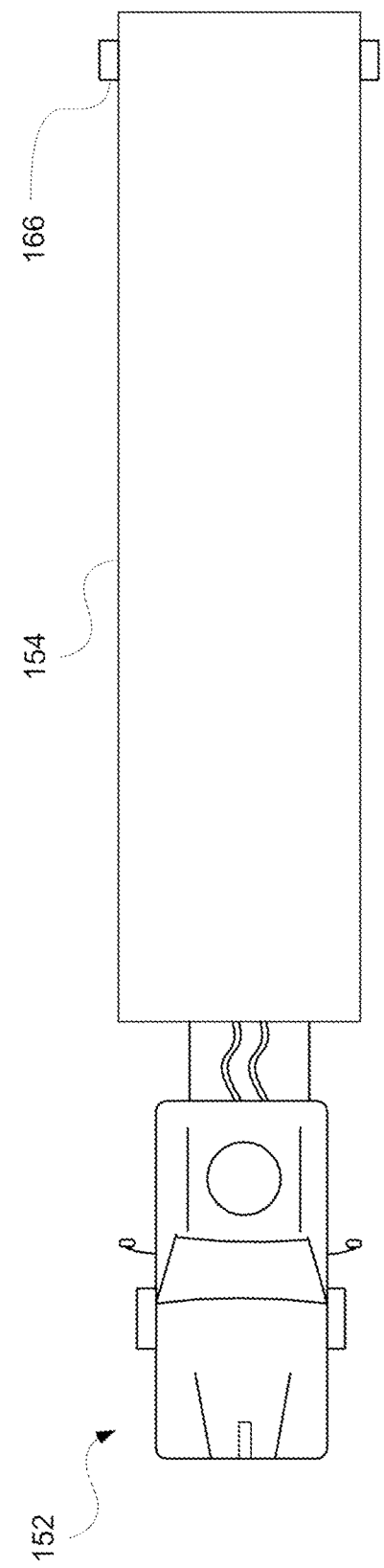

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

There are different degrees of autonomy that may occur for a self-driving vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes for which speed planning is employed, which are referred to herein as autonomous driving modes. Thus, reference to an autonomous driving mode herein includes both partial and full autonomy.

Figure 2:
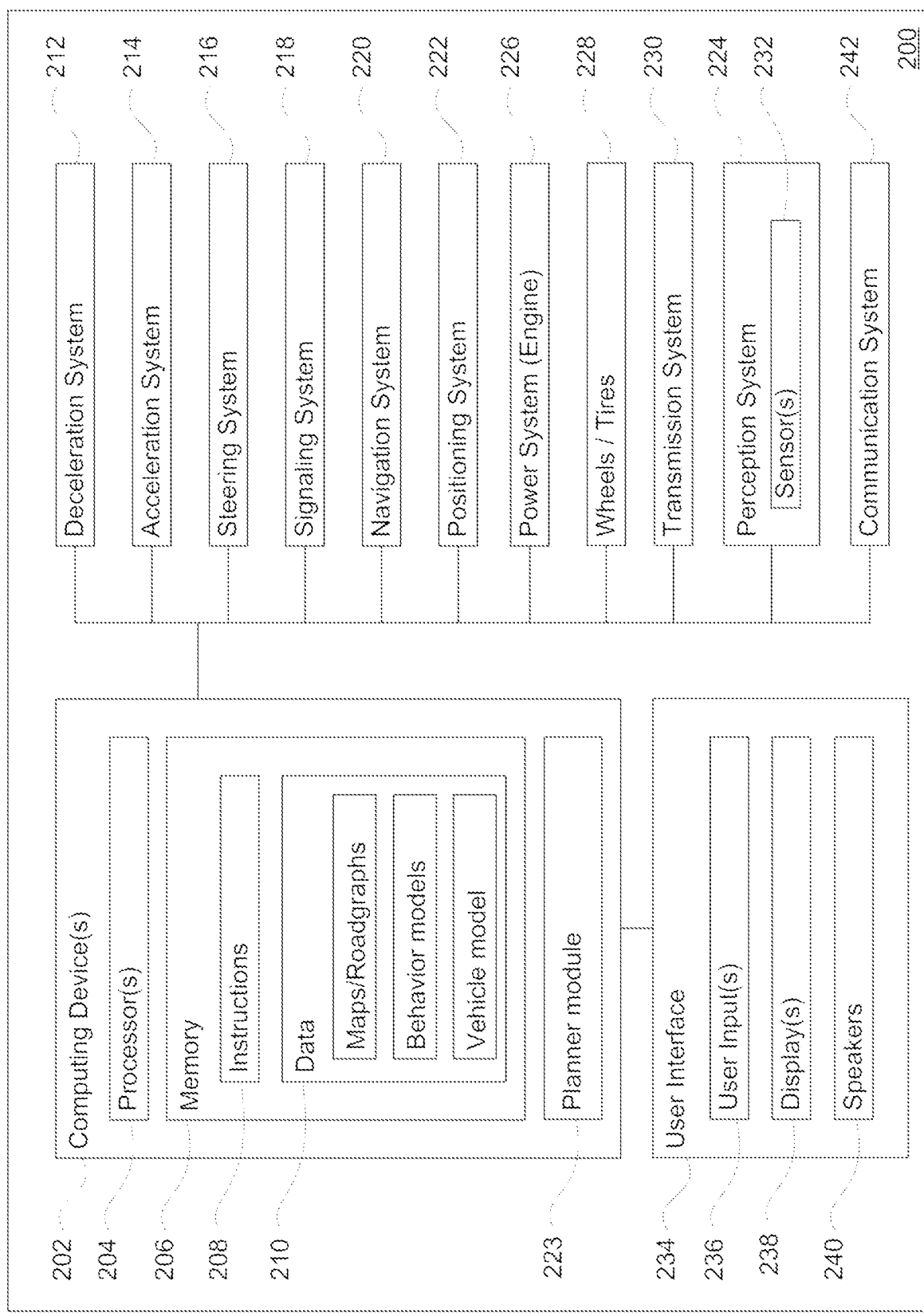
FIG. 2 illustrates components of an autonomous vehicle in accordance with aspects of the technology.

FIG. 2 illustrates a block diagram 200 with various components and systems of an exemplary vehicle, such as passenger vehicle 100 or 140, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. In one example, some or all of the memory 206 may be an event data recorder or other secure data storage system configured to store vehicle diagnostics and/or detected sensor data, which may be on board the vehicle or remote, depending on the implementation.

The data 210 can include, e.g., map information (e.g., roadgraphs), road user behavior models and/or behavior-time models, dynamic or static vehicle models, etc., which may be retrieved, stored or modified by one or more processors 204 in accordance with the instructions 208. In one example, behavior-related models and/or continuing lane models may be used to predict the future behavior of one or more detected objects in the vehicle's nearby environment for a pre-determined period of time, such as the next 10 seconds or more or less.

In one example, the models may be configured to use data for an object received from the perception system, and in particular another road user, including the road user's characteristics as well as additional contextual information. As an example, given the current location, heading, speed, and other characteristics included in the data from the vehicle's onboard perception system (e.g., historical information from the last 5-30 seconds), a given model may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur. This approach may be used by the processing system of the autonomous vehicle to make continuing lane-related decisions, for instance to avoid a road user that is predicted to continue straight instead of turning in a turn-only lane.

Thus, the models may be configured to generate a set of possible hypotheses for what a particular road user will do over a particular horizon or predetermined period of time (e.g. 10 seconds) and relative likelihoods for each hypothesis (e.g., a likelihood of making a turning as well as a likelihood of continuing forward instead of turning. These models may be trained using data about how an object observed at that location behaved in the past, roadgraphs indicating permissible and impermissible lane options, etc., and may also be specifically designated for particular types of objects, such as sedans, buses, pedestrians, motorcycles, bicyclists, emergency vehicles, construction vehicles, etc. The computing devices can then reason about hypotheses that interact with the vehicle's trajectory and are of a sufficient likelihood to be worth considering. Inputs to the models may include lane-specific features, agent-specific features and/or other features (see, e.g., FIG. 8B). For instance, lane-specific features can include one or more of lane heading, speed limit, curvature, incline, camber, whether there is a stop sign or other traffic sign present, whether there is a traffic light, entry and/or exit point(s), etc. Agent-specific features can include one or more of history (e.g., what the agent has done in the last 5-30 seconds, or more or less), speed, acceleration, heading, use of turn signal or hazard signal, etc. Other features may include one or more of the distance between the agent's current position and the lane of interest, the difference between the agent heading and lane heading, etc. In one scenario, Gradient Boosted Decision Trees (GDBT) models may be employed; however, in other scenarios other techniques such as heat maps, Deep Neural Networks (DNNs), Convolutional Neural Networks (CNNs), global nets, and/or Vector Nets could be employed. The models may be trained offline, for instance using a back-end remote computing system (see FIGS. 9A-B) or trained by the vehicle's onboard computing system.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination, for determining a speed plan for an upcoming timeframe (e.g., the next 5-20 seconds), or for making modifications to various driving aspects in view of current or expected environmental conditions.

The computing devices 202 are also operatively coupled to a perception system 224 (for detecting objects in the vehicle's environment and information about the vehicle such as tracking increases or decreases in speed and the direction of such changes), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from map information and navigation system 220. Computing devices 202 may use the positioning system 222 to determine the vehicle's location and the perception system 224 to detect and respond to objects when needed to reach the location safely. In order to do so, computing devices 202 may implement a speed plan that causes the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, which the computing devices 202 can use to navigate or control the vehicle. The map information may include information identifying the shape, location, and other characteristics of lanes, traffic signal lights, crosswalks, sidewalks, stop or yield signs, stop lines or other road markings, etc. Areas where a vehicle can drive may indicate the location and direction in which a vehicle should generally travel at various locations in the map information.

While the map information may be image-based maps, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a traffic light, a stop or yield sign or road markings such as stop lines and crosswalks may be linked to a road and an intersection, etc. In some examples, the associated data may include grid-based indices of a road network to allow for efficient lookup of certain road network features.

In this regard, the map information may include a plurality of graph nodes and edges representing road or lane segments that together make up the road network of the map information. In this case, each edge may be defined by a starting graph node having a specific geographic location (e.g., latitude, longitude, altitude, etc.), an ending graph node having a specific geographic location (e.g., latitude, longitude, altitude, etc.), and a direction. This direction may refer to a direction the vehicle must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

Thus, the maps may identify the shape, elevation/incline, curvature and camber of roadways, as well as the presence of lane markers, intersections, stop lines, crosswalks, posted speed limits, traffic signal lights (e.g., including turn signals), buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, road markings (e.g., crosswalks and stop lines), objects adjacent to the roadway such as sidewalks, trees or shrubbery, etc. The sensors may 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings.

Such sensors of the perception system 224 may detect objects outside of the vehicle and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions associated with the vehicle. For instance, sensors may detect, e.g., one or more persons, pets or packages, within the vehicle. Other sensors may detect conditions within and/or outside the vehicle such as temperature, humidity, etc. Still other sensors 232 of the perception system 224 may measure the rate of rotation and angle of the wheels 228, an amount or a type of braking by the deceleration system 212, overall vehicle pose, and other factors associated with the equipment of the vehicle itself.

The raw data and/or characteristics of objects received from the perception system may be used with contextual information as input to a behavior model of data 210 to make a prediction about what other objects are going to do for the predetermined period of time. For instance, information such as the object's type, location, pose along the roadway, recent motion heading, acceleration, and velocity may be combined with other information such as where the object is in the world using the detailed map information discussed above may be used as input to a behavior model. The contextual information may include the status of other objects in the environment, such as the states of traffic lights (e.g., including turn signals). In addition, features of other objects (such as vehicles) that might be crossing the objects' path may also be used as input to the model.

The raw data obtained by the sensors can be processed by the perception system 224 and/or sent for further processing to the computing devices 202 periodically or continuously as the data is generated by the perception system 224. For instance, the raw data from the sensors can be quantified or arranged into a descriptive function or vector for processing. Computing devices 202 may use the positioning system 222 to determine the vehicle's location and perception system 224 to detect and respond to objects and roadway information (e.g., signage, speed limits and/or road markings) when needed to reach the location safely, e.g., via adjustments made by planner module 223, including adjustments in view of expected continuing lane driving behavior by another vehicle.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle to provide information to riders, or to communicate with users or other people outside the vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
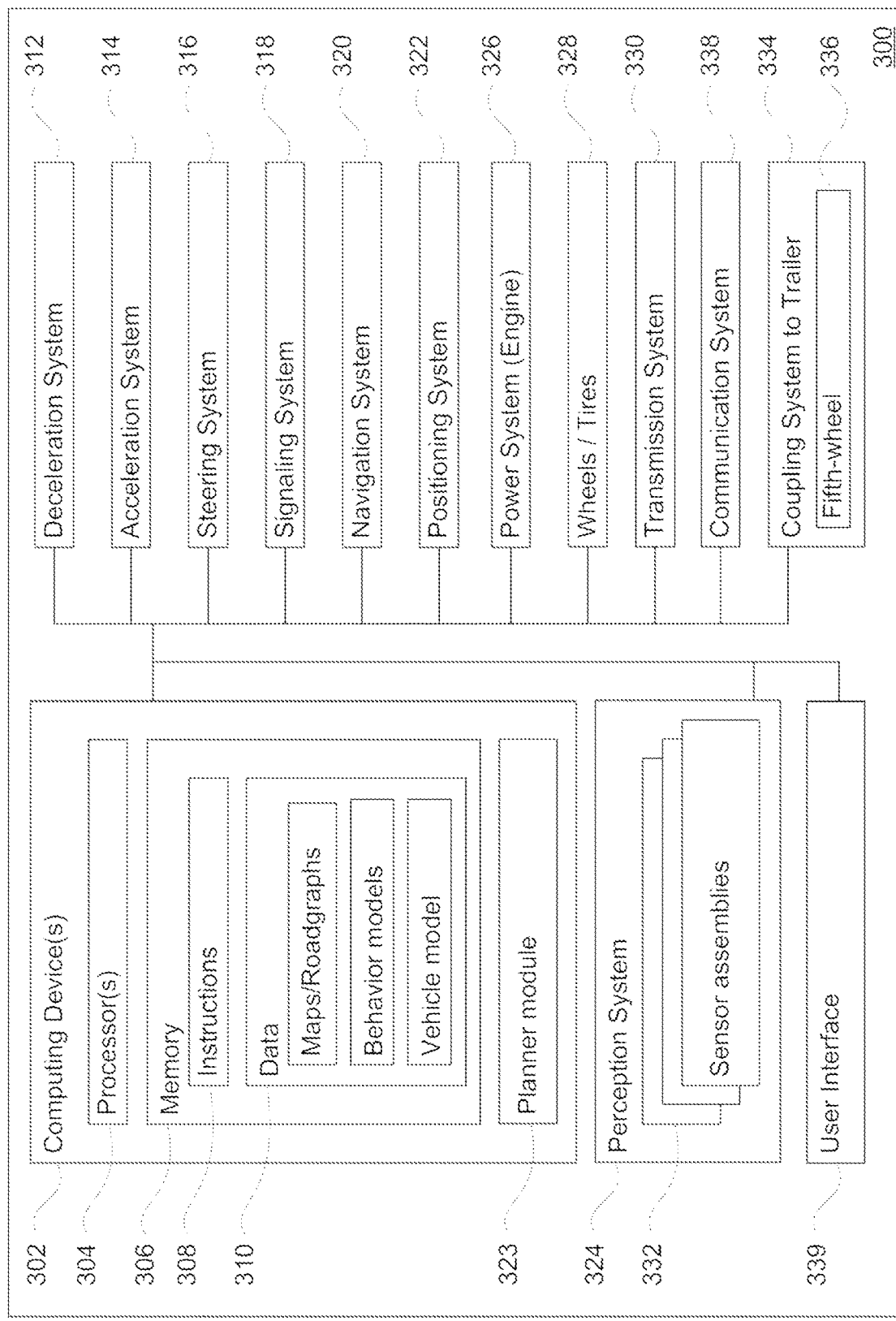
FIGS. 3A-B are block diagrams of systems of an example autonomous cargo-type vehicle in accordance with aspects of the technology.

FIG. 3A illustrates a block diagram 300 with various components and systems of a vehicle, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs), object behavior models, continuing lane models, etc.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
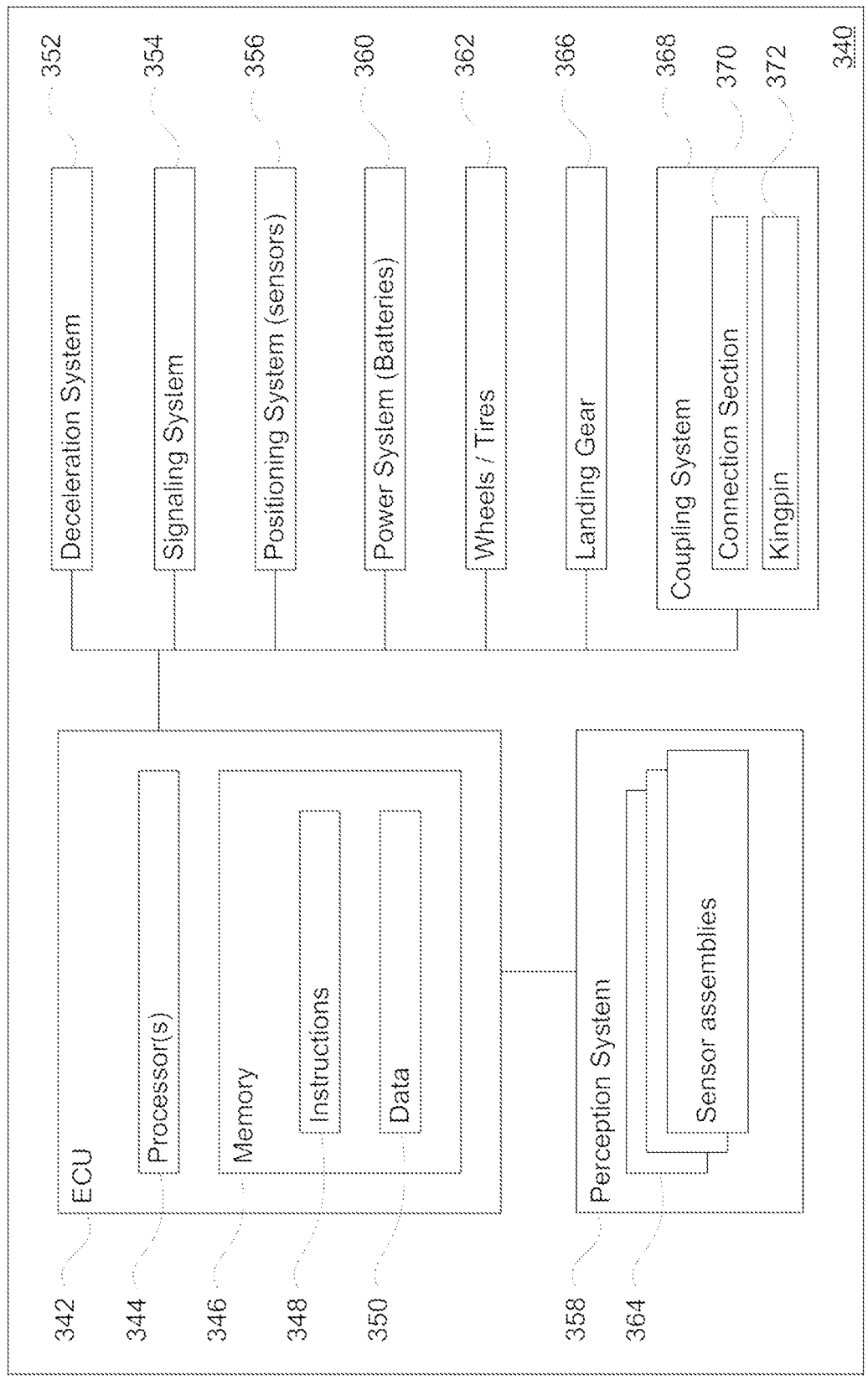

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Scenarios

Figure 4A:
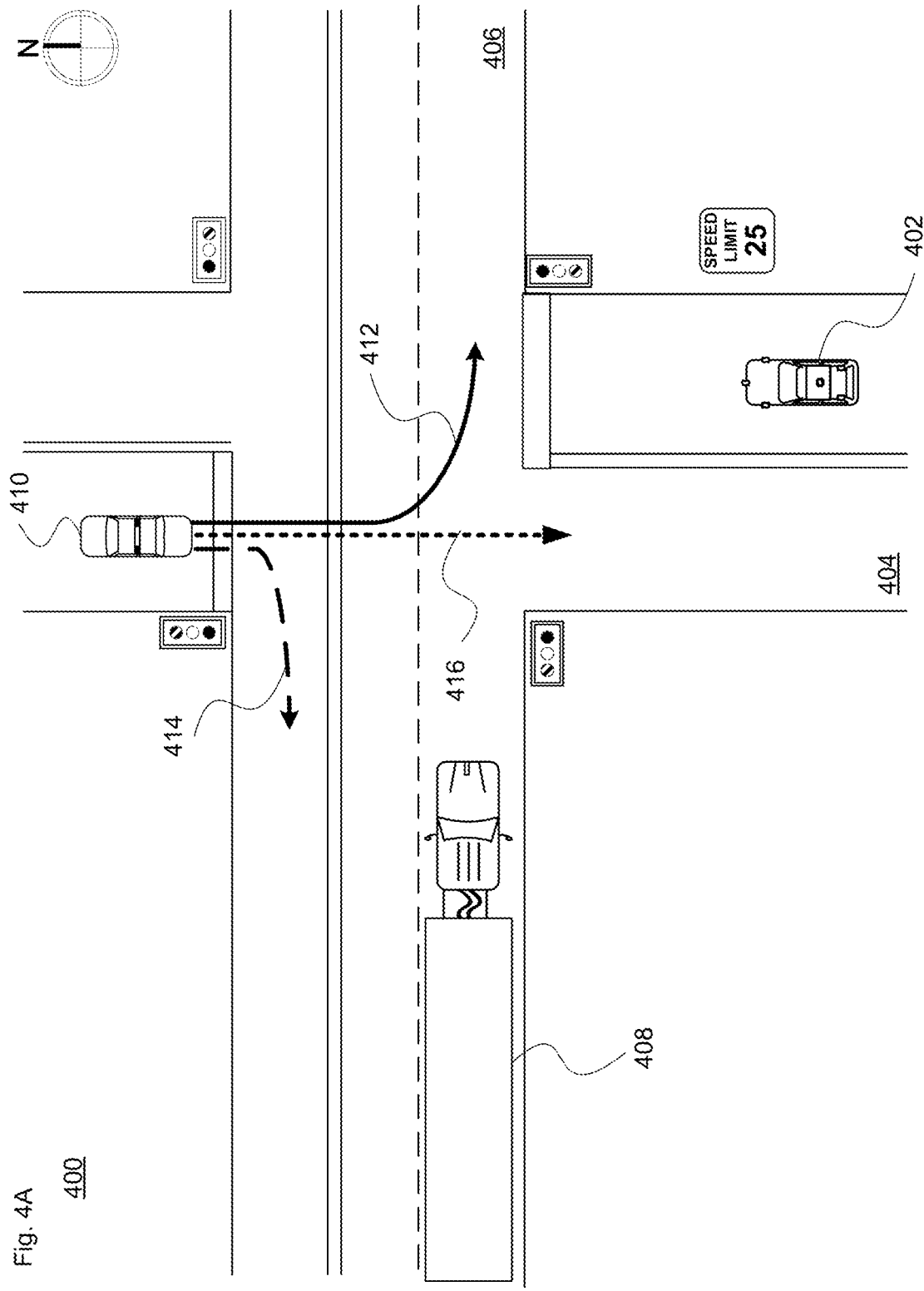
FIGS. 4A-B illustrate general turning scenarios in accordance with aspects of the technology.

FIG. 4A illustrates a general turning scenario 400, in which a vehicle 402 operating in an autonomous driving mode is traveling north on road segment 404. This north-south road segment intersects with east-west road segment 406. Traveling eastbound on road segment 406 is a truck 408, while another vehicle 410 approaches the intersection from a southbound direction on road segment 404. In this example, vehicle 410 may have different turning options at the intersection. It may make a left turn as shown by solid trajectory line 412, make a right turn as shown by dashed trajectory line 414, or proceed straight as shown by dotted trajectory line 416. Whether the vehicle can turn left or right or go straight can depend on legal lane restrictions, such as no left turn or no turn on red. Other restrictions may be due to the configuration of the roadway, including the presence of lane dividers, designated turning lanes or paths, etc.

As the vehicle 402 is being maneuvered by its computing device(s), the vehicle's perception system may provide the computing devices with information about objects, including other road users, detected in the vehicle's surrounding environment. For instance, the perception system may provide the vehicle's computing device (e.g., 202 in FIG. 2 or 302 in FIG. 3A) with information about truck 408 and car 410, such as their type, size, location, heading, velocity, lane, whether a turn signal is active, etc.

The raw data and/or characteristics of objects received from the perception system may be used with contextual information as input to a behavior model to make a prediction about what other objects are going to do for the predetermined period of time. For instance, information such as the object's type, location, recent motion heading, acceleration, and velocity may be combined with other information, such as whether a turn signal is activated and where the object is in the world using the detailed map information discussed above (e.g., which lane on a multi-lane road segment the object is traveling on). This information may be used as inputs to a behavior model. The contextual information may also include the status of static objects in the environment, such as the states of traffic lights or the presence of a stop or yield sign.

The behavior model may provide a set of hypotheses, with each hypothesis having an associated likelihood value. As an example, one or more of those hypotheses with the highest likelihoods (or those above a particular threshold such that a given hypothesis is considered to have a reasonable likelihood of occurrence) may be identified as an actual future trajectory or behavior prediction for the object over the predetermined period of time. For instance, the vehicle's computing devices may use a behavior model to generate a prediction of what an object will do during the next predetermined period of time (e.g., 2-10 seconds) or a time period corresponding to how long the vehicle is likely to interact with the object (e.g., until the object is well behind the autonomous vehicle). Given this, the computing devices may predict that car 410 is going to continue move towards and pass through the intersection according to trajectory 416, turn right according to trajectory 414, or turn left according to trajectory 412. The computing devices may also predict whether truck 408 is going to be stopped at the traffic light facing the eastbound lanes.

Figure 4B:
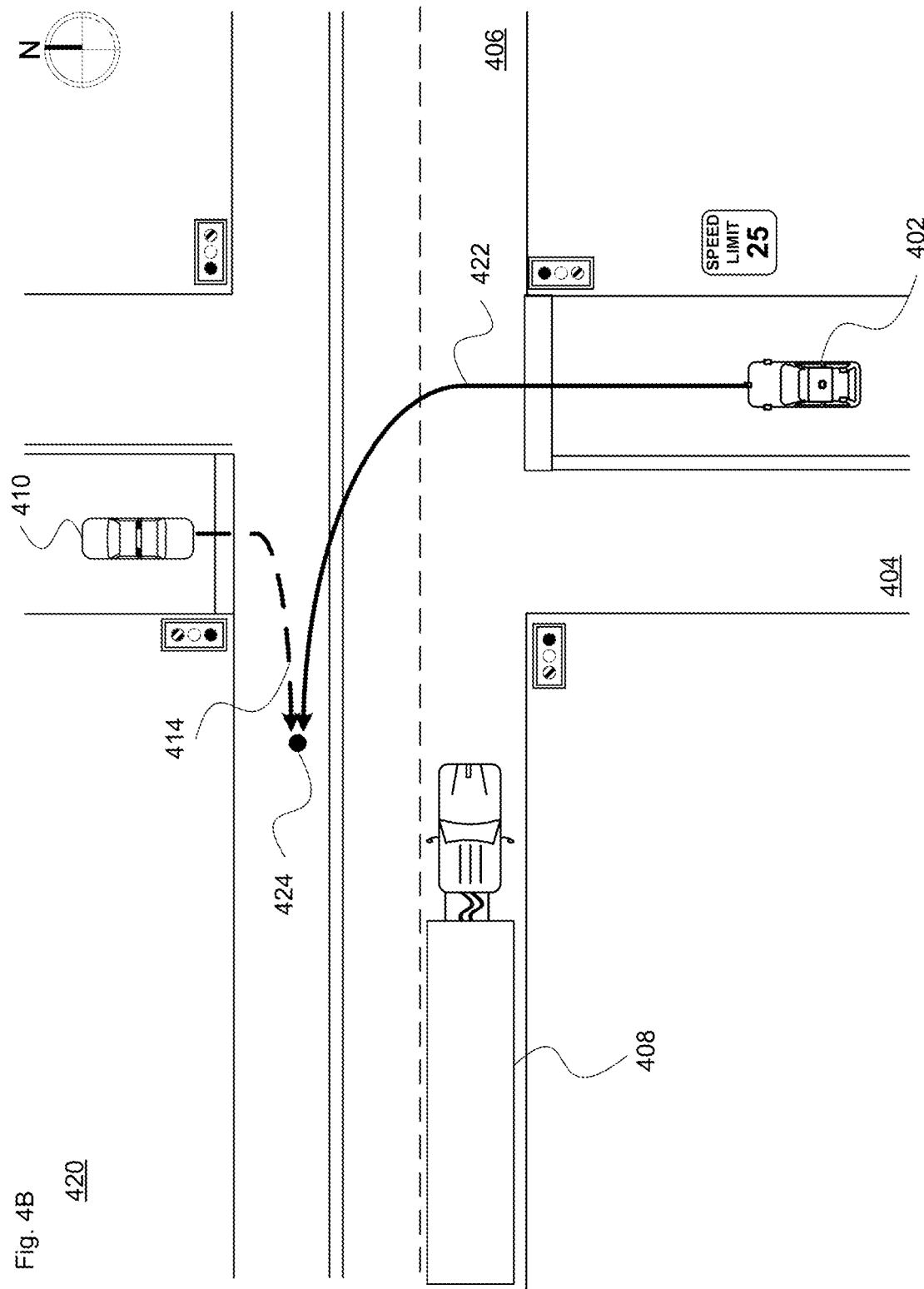

In view 420 of FIG. 4B, assume that it is predicted that the car 410 will make a right turn according to trajectory 414, and that the vehicle 402 will be turning left at the intersection along path 422. Therefore, according to the predicted trajectory in this example, the route 422 of vehicle 402 and the trajectory of car 410 are expected to intersect at point 424. As such, a constraint may be generated for vehicle 402 to avoid the point 424, at the point in time when car 410 (or any portion of that car) is expected to overlap with point 424. This may involve slowing down or delaying entering the intersection.

Figure 5A:
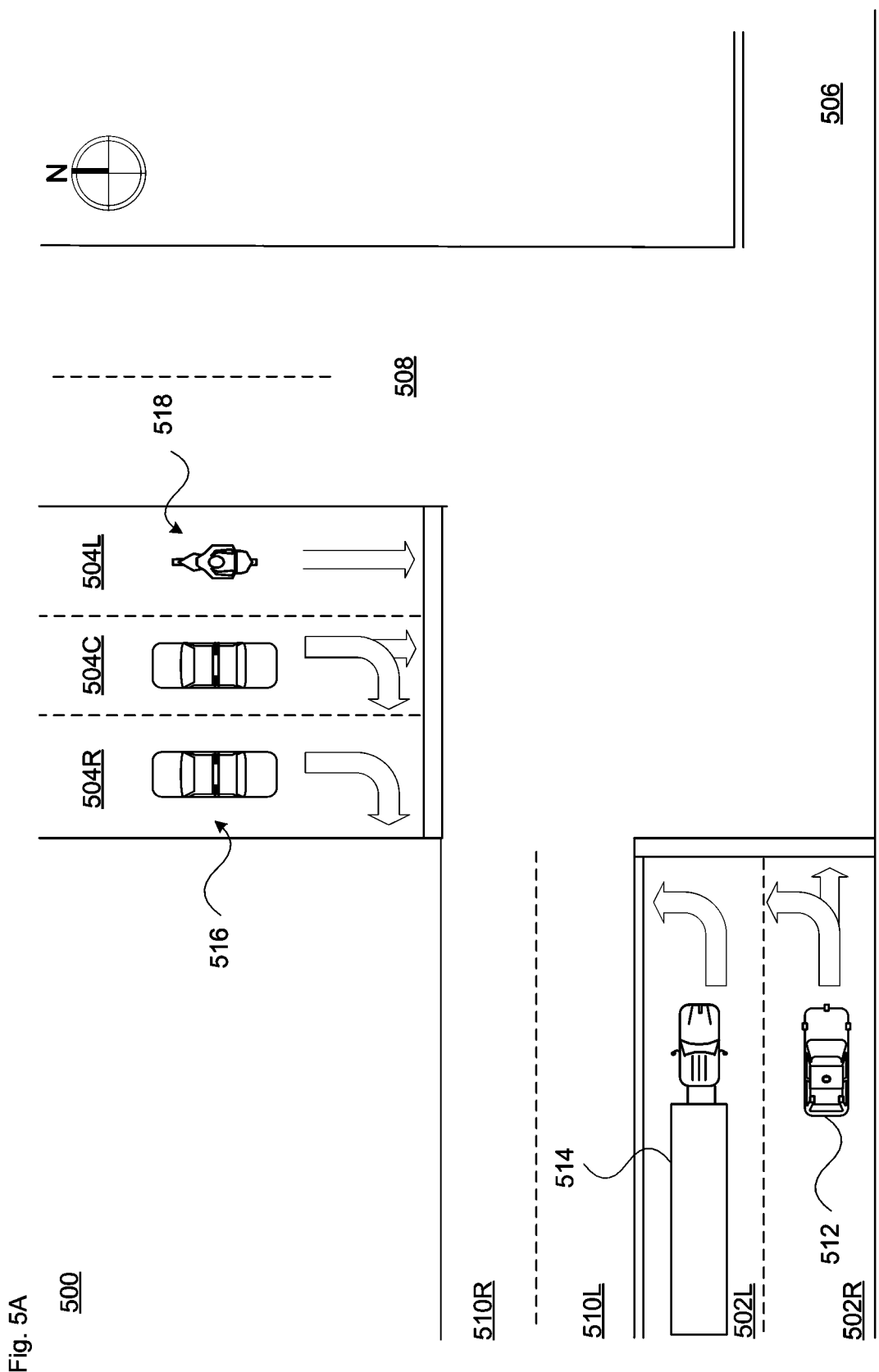

FIG. 5A illustrates a continuing lane driving scenario 500 at an intersection where lanes 502L and 502R are eastbound approaching the intersection and lanes 504L, 504C and 504R are southbound approaching the intersection. Lane 506 is eastbound heading away from the intersection, lane 508 is northbound heading away from the intersection, and lanes 510L and 510R are westbound heading away from the intersection. In this scenario, a vehicle 512 operating in an autonomous driving mode is in lane 502R, while a truck 514 is in lane 502L. A pair of cars 516 are in lanes 504L and 504C, while a motorcyclist 518 is in lane 504R.

As shown by the arrows along the roadway, road users in lane 502R may continue straight towards lane 506 or make a left along lane 508. In contrast, lane 502L is a left turn only lane. Southbound lanes 504 have different turning options. Here, lane 504L is indicated as being able to go straight only, while road users in lane 504C may go either straight or turn right (e.g., onto lane 510L). And road users in lane 504R should only turn right (e.g., onto lane 510R).

If it is assumed that all road users will follow the road signs and any legal lane restrictions, then behavior predictions for the various objects (e.g., truck 514, cars 516 and motorcycle 518) could be determined as discussed above in accordance with information obtained from the vehicle's sensors as well as contextual information. However, should another road user perform a continuing lane driving behavior (e.g., continue straight from a turn-only lane, or make a turn from a lane that is for continuing straight only), then such behavior predictions would not encompass that type of driving action. Therefore, the vehicle operating in the autonomous mode might need to quickly respond by braking hard and/or making an unplanned lane change. These reactions may have excessive impact on lateral and/or longitudinal acceleration or jerk, which can adversely affect passenger comfort.

Figure 5B:
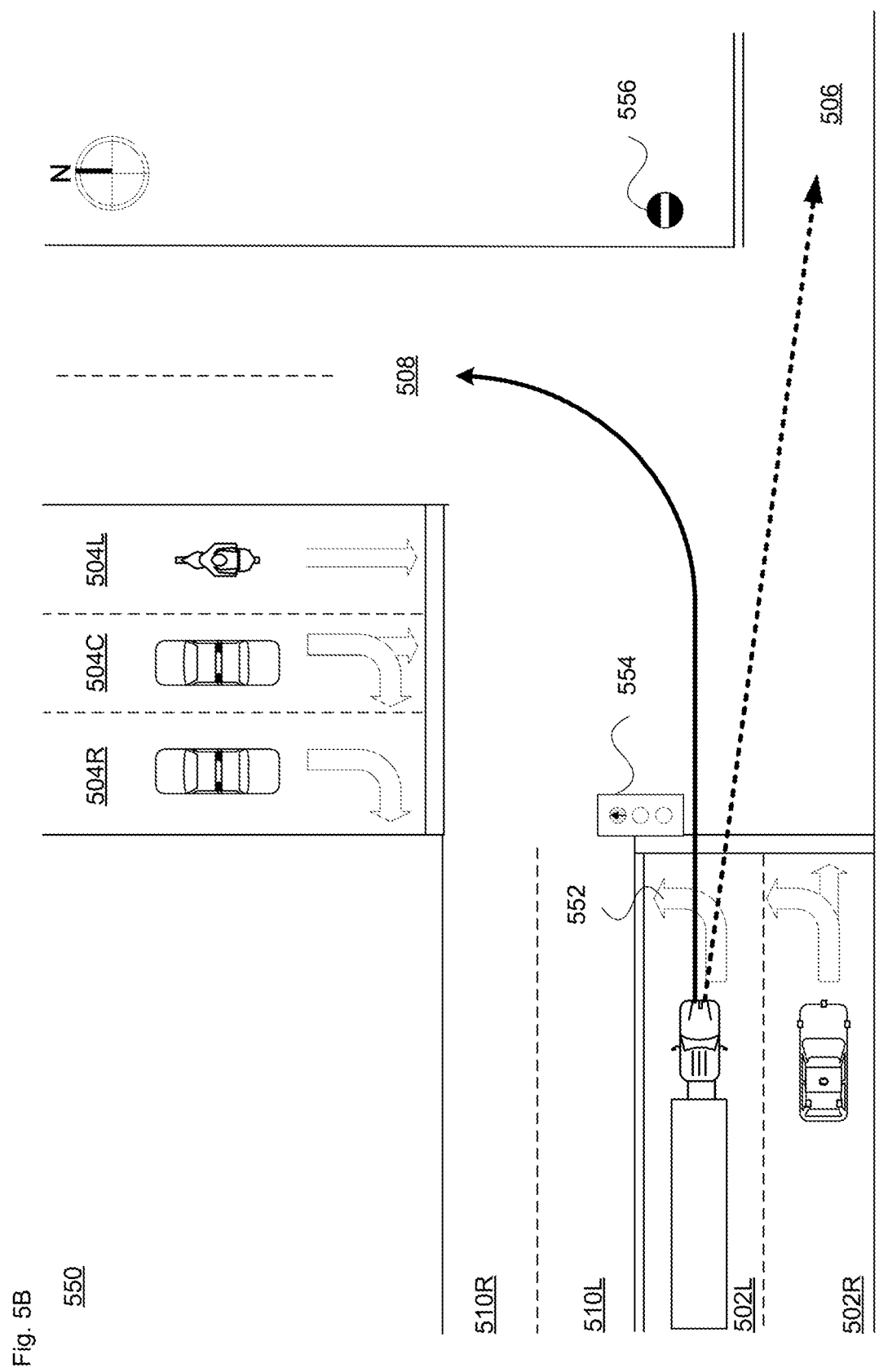

FIG. 5B illustrates view 550, which involves a first continuing lane driving behavior by the truck 514. Here, as noted above, lane 502L is configured so that road users must turn left onto lane 508. The lane 502L may include indicia 552 on the road surface such as a painted arrow and/or text showing it is a left turn only lane. A traffic signal 554 may include a left turn light and/or text showing it is a left turn only lane. There may be other signage 556 along another part of the intersection indicating that the lane is not a continuing lane. Thus, the truck in this example has two options: turn left along trajectory 558 onto northbound lane 508 as shown by the solid arrow, or perform a continuing lane driving action along trajectory 560 to eastbound lane 506, as shown by the dotted arrow. A roadgraph or other stored road information may also indicate that lane 502L is a left turn only lane having an exit point that should lead to lane 508. In this example, the roadgraph would connect lane 502L with lane 508, but not with lane 506.

Should the vehicle in lane 502R predict that the truck will perform the continuing lane driving action, then that vehicle may modify its own driving operation. For instance, this could include waiting at the intersection after the light turns green in order to evaluate that the truck is indeed moving towards lane 506. Alternatively, it could include moving forward toward lane 506 more quickly than initially planned (e.g., accelerate from a stop more quickly and/or select a driving speed that is higher than initially planned).

FIG. 5C illustrates view 570, which involves a second continuing lane driving behavior by the car in lane 504R. Here, as noted above, lane 504R is configured so that road users must turn right onto lane 510 (e.g., 510R). The lanes 504 may include indicia 572 on the road surface such as a painted arrow and/or text showing it is a left turn only lane. A traffic signal 574 may include a right turn light ($574_R$) and/or text showing it is a left turn only lane. There may be other signage along another part of the intersection indicating that the lane is not a continuing lane. Thus, the car in lane 504R in this example has two options: turn right along trajectory 576 onto westbound lane 510 (e.g., 510R) as shown by the solid arrow, or perform a continuing lane driving action along trajectory 578 southbound through the intersection, as shown by the dotted arrow. A roadgraph or other stored road information may also indicate that lane 504R is a right turn only lane with an exit point that should lead to lane 510. In this example, the roadgraph would connect lane 504R with lane 510 (e.g., 510R), but not with a lane segment that passes southbound through the intersection.

Should the vehicle in lane 502R predict that the car in lane 504R will perform the continuing lane driving action southbound into the intersection, then that vehicle may modify its own driving operation. For instance, this could include waiting at the intersection after the light turns green in order to evaluate that the car is indeed moving towards lane 510. Alternatively, the vehicle could speed up to make sure it has cleared the intersection before the agent reaches that position.

According to aspects of the technology, machine learning approaches are used in order to obtain enhanced predictions and generate more accurate behavior predictions for continuing lane driving situations. This includes determining whether a given lane should be considered a "continuing lane", e.g., a turn only lane having all "exits" (possible driving locations) in the same direction. It also includes determining whether a continuing lane driving action should be generated for a road user in the continuing lane.

Figure 6:
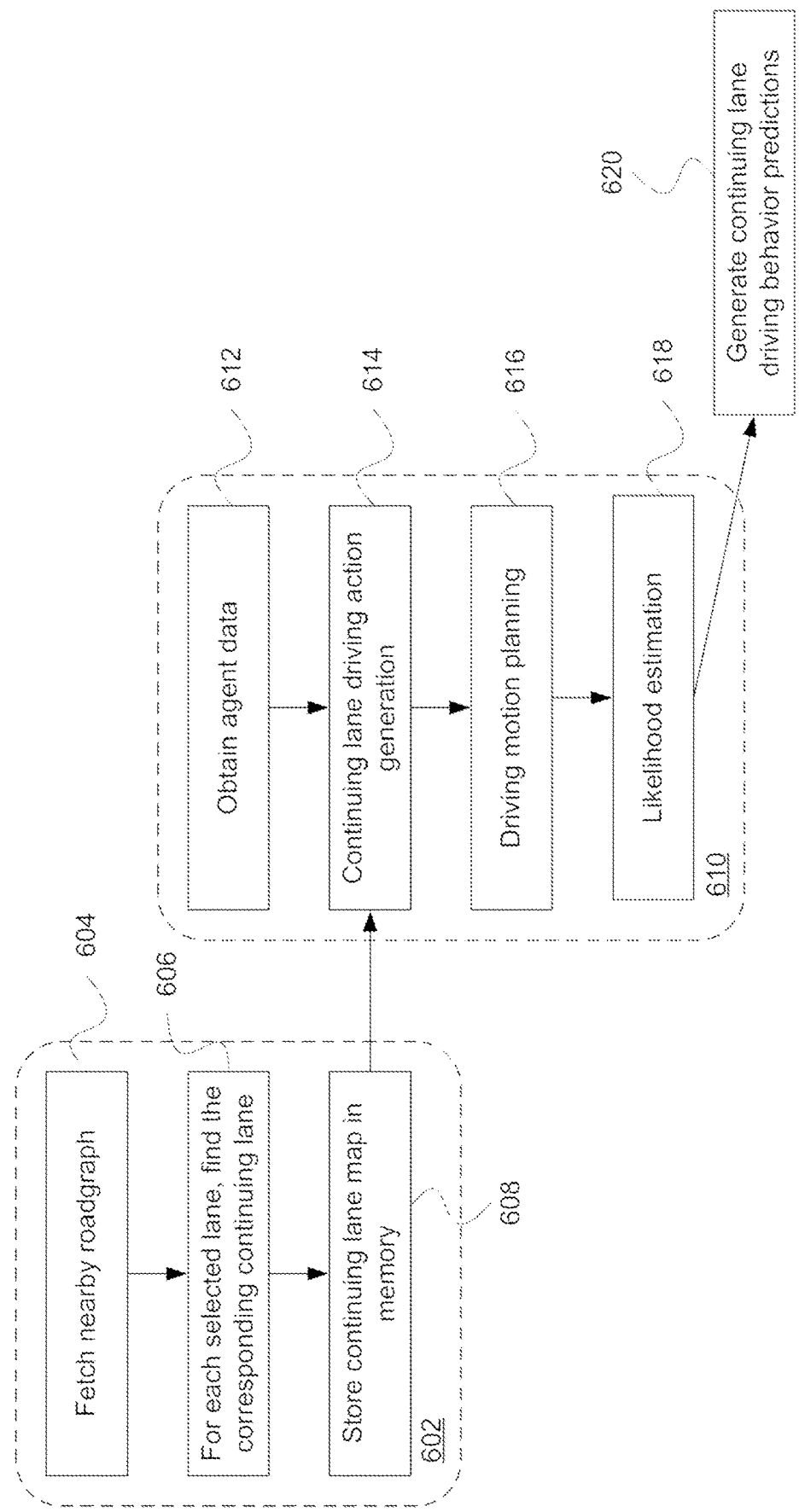
FIG. 6 illustrates an example process in accordance with aspects of the technology.

FIG. 6 illustrates a flow diagram 600, which illustrates one approach for identifying possible continuing lane driving behaviors. In a first module 602, information about a nearby roadgraph is fetched in block 604. Nearby in this situation means within a curtain radius of the autonomous vehicle. For example, this could be within 200 meters of the vehicle. In another example, the curtain radius may be between 50-500 meters. And in yet another example, the curtain radius may be within X blocks (e.g., a 1-4 block radius). Then at block 606, for each selected lane associated with the roadgraph, find whether there are any corresponding continuing lane(s), which are not valid ("legal") driving paths in view of the roadgraph data. In one example there may be a 1:1 correspondence between the selected lane and a continuing lane. In another example, there may be a 1:2, 1:3 or greater correspondence between the selected lane and multiple continuing lanes. At block 608, the details (e.g., map information) of the continuing lane are stored in memory. In module 610, agent data for objects in the vicinity of the vehicle (e.g., cars, motorcycles, bicycles, trucks or other road users) is obtained at block 612, such as by one or more sensors of the vehicle's perception system. The perception system and/or the onboard computing system may use the obtained information (e.g., position, pose, heading, speed, etc.) to identify what type of object has been detected. At block 614, the system generates continuing lane driving actions. Here, the system decides whether to generate a continuing lane driving behavior prediction for the agent (e.g., that the agent may elect to drive along a continuing lane). This block takes as input the agent features, roadgraph features and the previously fetched candidates, and then decides whether to generate a continuing lane driving behavior prediction based on that. Based on this, at block 616 the system performs driving motion planning. In particular, this means the system will generate a motion plan that would encompass that driving prediction for continuing lane driving. And at block 618, likelihood estimation is performed. In particular, the system will assign a likelihood/probability to the prediction which indicates the probability of continuing lane driving happening. The likelihood estimation information generated at block 618 is then used by the system at block 620 to generate continuing lane driving behavior predictions. This may be used by the planner or other part of the onboard computing system to modify autonomous driving operations of the vehicle.

Figure 7A:
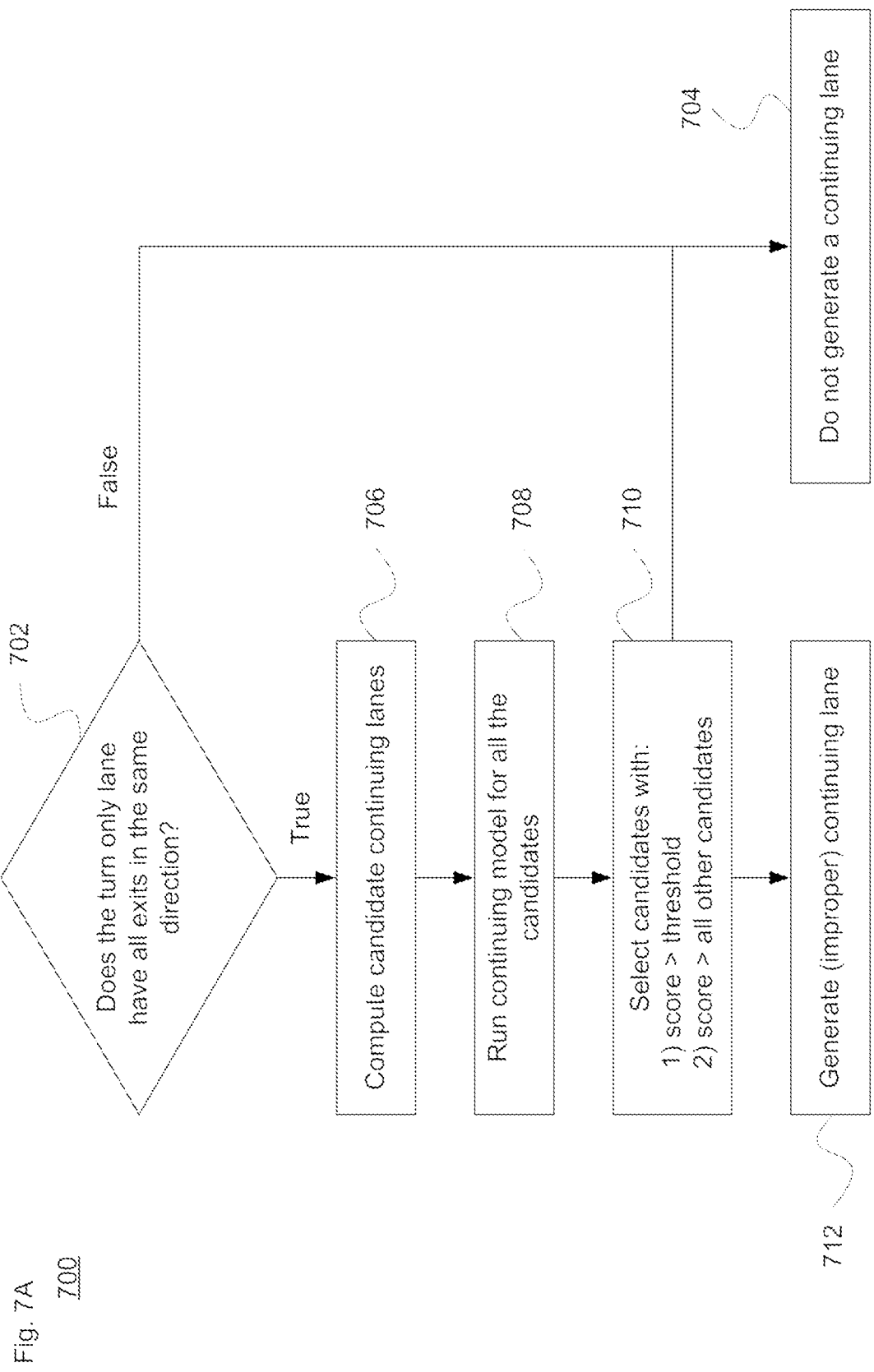

FIG. 7A illustrates a flow diagram 700, which is one example for determining whether there is no valid (permissible) continuing lane according to block 606 of FIG. 6. At block 702, a decision is made as to whether a turn only lane has all the same exists in the same direction. In other words, the system checks whether this turn only lane has only turning lanes going out from it (exits and all turn in the same direction). If the answer to this decision is false, then at block 704 an impermissible continuing lane is not generated by the system. Because the system is already aware of the legal driving lanes from the roadgraph data, there is no need to run this model to determine legal driving lanes.

At block 706, candidate continuing lanes are computed, which identify any possible impermissible continuing lanes. At block 708, the system runs a continuing model for all of the candidates. The continuing model is a machine learning model. At block 710, the system (1) selects any candidates having a score greater than a threshold, and (2) finds the candidate having the highest score among all the candidates. If there is no candidate that satisfies these conditions, then at block 704 an impermissible continuing lane is not generated by the system. Otherwise, at block 712 the system generates a continuing lane associated with an improper (not permitted) driving operation, such as continuing straight instead of making a turn in a turn-only lane. All (improper) continuing lanes may be stored in a cache or other memory of the system. Inputs to the model may include any combination of source lane features, target lane features, and related features (see example 800 of FIG. 8A). For instance, source lane features may include turn only lane features such as heading, curvature, incline, camber, the presence of a traffic light, the presence of a stop sign or other signage (e.g., yield sign or no turn sign). Target lane features may include the same features. Related features may encompass features from a combination of source and target lanes, such as heading difference, distance between the source and target lanes, lateral distance, etc. In one scenario a GDBT model may be employed; however, in other scenarios other techniques such as heat maps, DNNs, CNNs, global nets, and/or Vector Nets could be employed. The threshold may be determined based on the testing framework used; however, this threshold can be tunable and hence can be set according to the needs of the system. By way of example, the threshold may be any number between 0 and 1, such as 0.68, or above 0.6, or no less than 0.75, etc. Scores are the output of the model. For Tree-based models, scores are the output from the leaf nodes, while for Deep net models they are the output from output layers.

FIG. 7B illustrates a flow diagram 750, which is one example for generating impermissible continuing lane driving behavior predictions for one or more road users in the vehicle's nearby environment (e.g., at the same intersection), according to block 614 of FIG. 6. At block 752, the system generates a continuing lane action for a given agent in the vehicle's vicinity (e.g., at the same intersection, within a 1-block radius, within 200 meters, etc.). At block 754, the system fetches all nearby continuing lanes from memory, for instance which were generated at block 712. At block 756, the system runs a continuing model for all of the candidates. The continuing model is a machine learning model that may be trained, for instance, using inputs as shown in example 820 of FIG. 8B. At block 758, the system (1) selects any candidates having a score greater than a threshold, and (2) finds the candidate having the highest score among all the candidates. If there is no candidate that satisfies these conditions, then a continuing lane does not exist, and the process terminates at block 760, where the system does not generate a continuing lane driving action (that would show an improper driving behavior for another road user). Otherwise, at block 762 the system generates a continuing lane driving action, such as continuing straight instead of making a turn in a turn-only lane. All (improper) continuing lane actions may be stored in a cache or other memory of the system. Here the system takes in input for the agent, the roadgraph and any continuing lanes derived based on the approach from FIG. 7A. In the process shown in FIG. 7B, the system uses features from a given road user/agent, roadgraph data and the continuing lane(s) under evaluation. The threshold may be determined based on the testing framework used; however, this threshold can be tunable and hence can be set according to the needs of the system. By way of example, the threshold may be any number between 0 and 1, such as 0.64, or above 0.56, or no less than 0.8, etc. Scores are the output of the model. For Tree-based models, scores are the output from the leaf nodes, while for Deep net models they are the output from output layers.

The driving motion planner may use the continuing lane driving actions to adjust a driving plan for the vehicle in any of the manners described above. The processes may be performed multiple times, for instance two or more times a second when the vehicle operating in an autonomous driving mode is approach an intersection or is waiting at a stop light or a stop or yield sign. The models and information about continuing lane generation and/or continuing lane driving action generation may be shared with other vehicles, including vehicles that are part of a fleet (e.g., a fleet of ridesharing, ride hailing or delivery vehicles), as well as with a back end system that maintains the models and associated information.

Figure 8A:
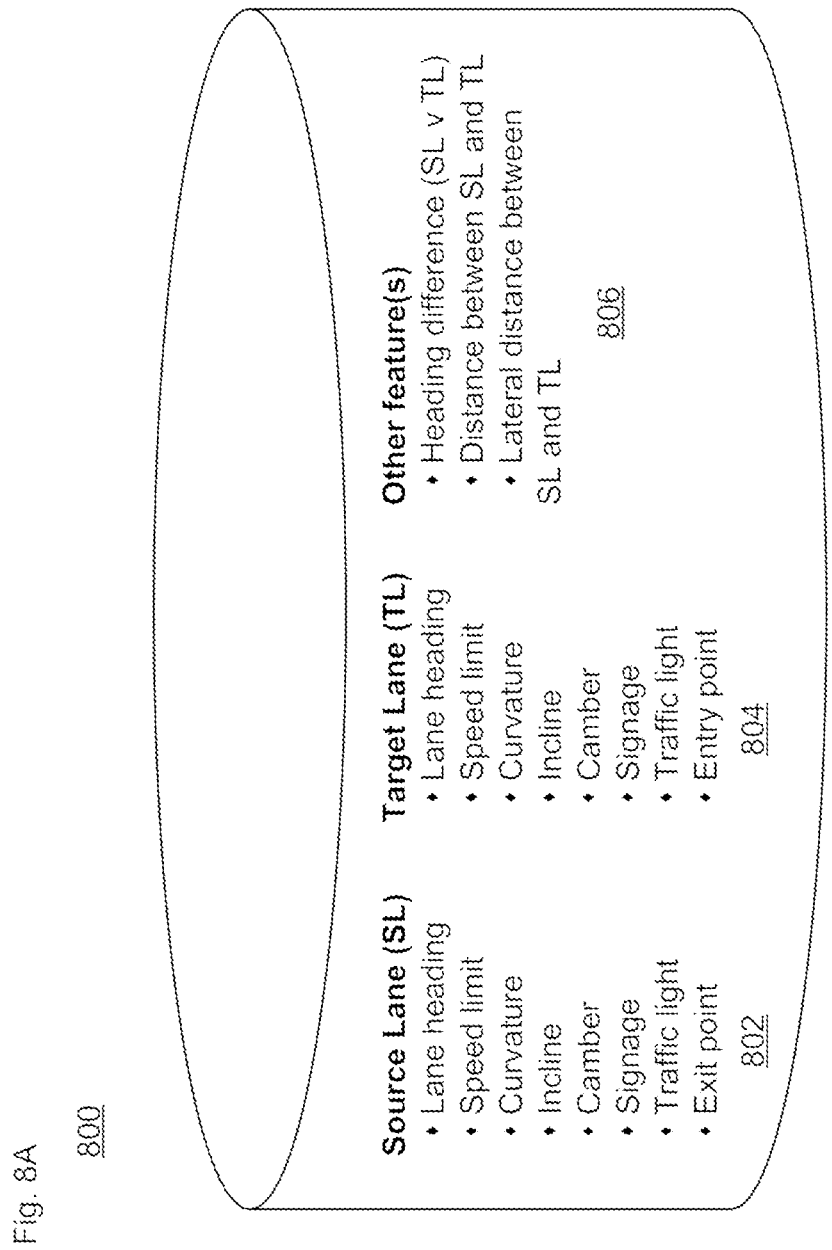
FIGS. 8A-B illustrate features that can be stored and used as training inputs in accordance with aspects of the technology.

Example 800 of FIG. 8A illustrates features that can be gathered and stored as training inputs used to determine whether there is no valid (permissible) continuing lane according to block 606 of FIG. 6. Here, the inputs include source lane features 802, target lane features 804, and/or related features 806. For instance, source lane features 802 may include turn only lane features such as heading, curvature, incline, camber, the presence of a traffic light, the presence of a stop sign or other signage (e.g., yield sign or no turn sign). Target lane features 804 may include the same types of features. Related features 806 may encompass features based upon the relationship of source and target lanes, such as heading difference, distance between the source and target lanes, lateral distance, etc.

Figure 8B:
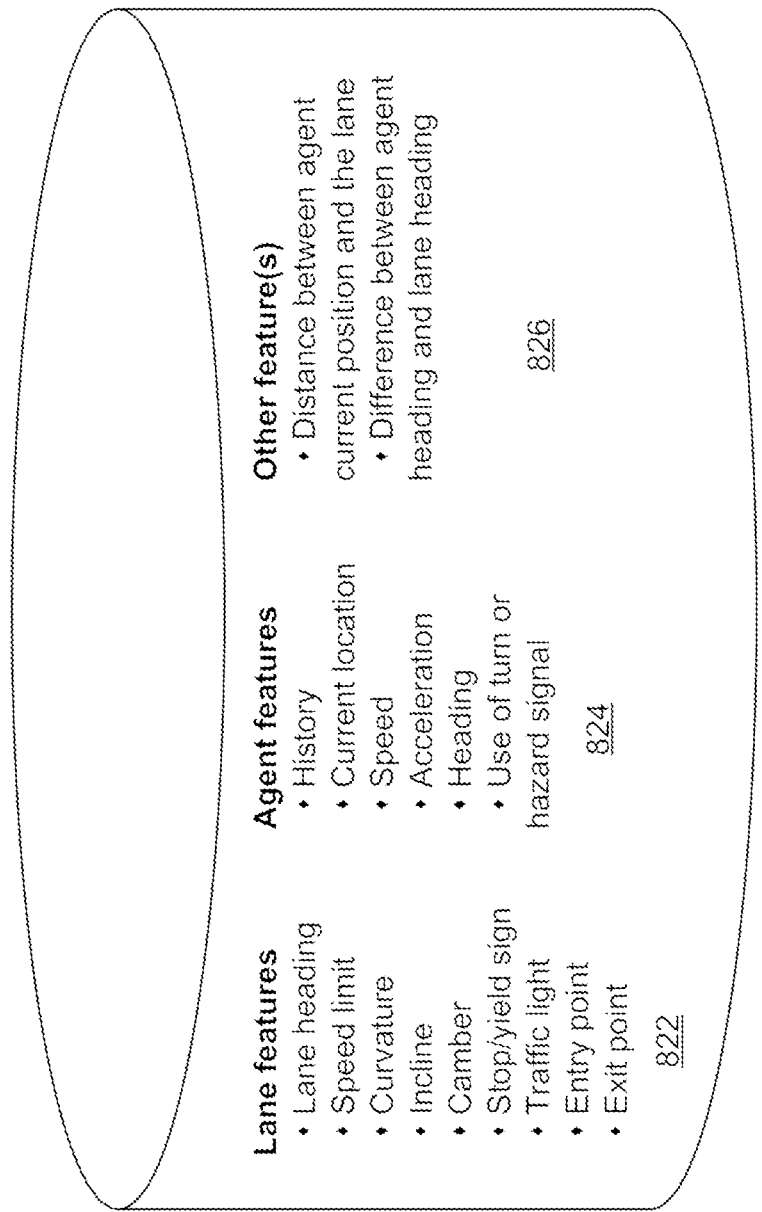

Example 820 of FIG. 8B illustrates features that can be gathered and stored as training inputs used when determining whether to generate a continuing lane driving action as discussed above with regard to flow diagram 750. Here, the inputs may include lane features 822, agent features 824 and/or other features 826. As noted above, the lane features 822 may be one or more of the lane heading, speed limit (e.g., posted speed limit), curvature, incline, camber, whether there is a traffic light and/or the presence of signage such as a stop or yield sign. The agent features 824 may include one or more of recent history (e.g., what the agent has done in the last 5-30 seconds or more or less), speed, acceleration, heading, use of turn signal or hazard signal, etc. And the other features 826 may include features based on the relationship between the agent and the lane, such as the distance between the agent's current position and the lane, or a difference between the agent's heading and the lane heading.

The machine learning approaches discussed herein may use trained models in real time. However, in some situations, the approaches used to determine whether there is no valid (permissible) continuing lane can be preprocessed (e.g., during an earlier driving situation or received from another vehicle at that location) and stored in the vehicle's memory. Such stored data, which may or may not be associated with a roadgraph, can be retrieved and used when determining whether to generate a continuing lane driving action.

In addition to using the model information for operation of the vehicle in real time, this information may also be shared with other vehicles, such as vehicles that are part of a fleet. This can be done to aid in route planning, gathering of additional ground truth data, model updates, etc.

Figure 9B:
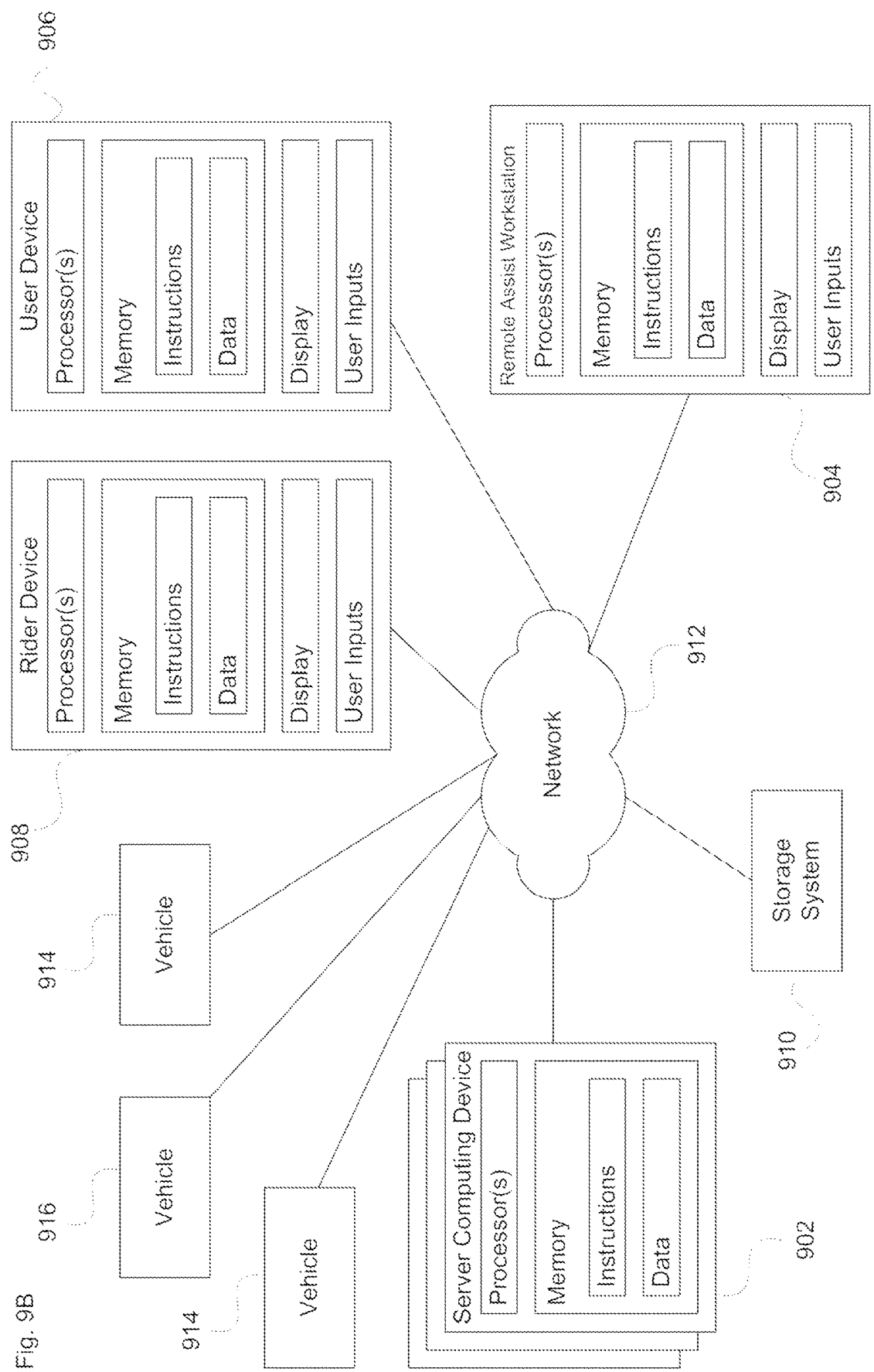

One example of data sharing is shown in FIGS. 9A and 9B. In particular, FIGS. 9A and 9B are pictorial and functional diagrams, respectively, of an example system 900 that includes a plurality of computing devices 902, 904, 906, 908 and a storage system 910 connected via a network 912. System 900 also includes exemplary vehicles 914 and 916, which may be configured the same as or similarly to any of vehicles 100, 140 and 150. Vehicles 914 and/or vehicles 916 may be part of a fleet of vehicles. Although only a few vehicles and computing devices are depicted for simplicity, a typical system may include significantly more.

As shown in FIG. 9B, each of computing devices 902, 904, 906 and 908 may include one or more processors, memory, data and instructions. Such processors, memories, data and instructions may be configured similarly to the ones described above with regard to FIGS. 2 and 3A-B.

The various computing devices and vehicles may communicate via one or more networks, such as network 912. The network 912, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 902 may include one or more server computing devices that are capable of communicating with the computing devices of vehicles 914 and/or 916, as well as computing devices 904, 906 and 908 via the network 912. For example, vehicles 914 and/or 916 may be a part of one or more fleets of vehicles that can be dispatched by a server computing device to various locations. In this regard, the computing device 902 may function as a dispatching server computing system which can be used to dispatch vehicles to different locations in order to pick up and drop off passengers and/or to pick up and deliver cargo. In addition, server computing device 902 may use network 912 to transmit and present information to a user of one of the other computing devices or a passenger of a vehicle. In this regard, computing devices 904, 906 and 908 may be considered client computing devices.

As shown in FIG. 9A each client computing device 904, 906 and 908 may be a personal computing device intended for use by a respective user 918, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 906 and 908 may be mobile phones or devices such as a wireless-enabled PDA, a tablet PC, a wearable computing device (e.g., a smartwatch), or a netbook that is capable of obtaining information via the Internet or other networks.

In some examples, client computing device 904 may be a remote assistance workstation used by an administrator or operator to communicate with passengers of dispatched vehicles. Although only a single remote assistance workstation 904 is shown in FIGS. 9A-9B, any number of such work stations may be included in a given system. Moreover, although the work station is depicted as a desktop-type computer, the work station may include various types of personal computing devices such as laptops, netbooks, tablet computers, etc.

Storage system 910 can be of any type of computerized storage capable of storing information accessible by the server computing devices 902, such as a hard-drive, memory card, ROM, RAM, DVD, CD-ROM, flash drive and/or tape drive. In addition, storage system 910 may include a distributed storage system where data is stored on a plurality of different storage devices which may be physically located at the same or different geographic locations. Storage system 910 may be connected to the computing devices via the network 912 as shown in FIGS. 9A-B, and/or may be directly connected to or incorporated into any of the computing devices.

Storage system 910 may store various types of information, including data used as inputs to the models discussed herein, including lane information (e.g., source and/or target lanes), agent features and/or other features). The storage system 910 may also store autonomous vehicle control software and/or road condition models, which may be used by vehicles, such as vehicles 914 or 916, to operate such vehicles in an autonomous driving mode. Storage system 910 may store map information (such as roadgraph information), route information, weather condition information, road surface information, vehicle models for the vehicles 914 and 916, weather information, etc. This information may be shared with the vehicles 914 and 916, for instance to help with real-time route planning and driving analysis by the on-board computer system(s), including when determining whether a road user may be likely to perform a continuing lane driving operation.

The remote assistance workstation 904 may access the stored information and use it to assist operation of a single vehicle or a fleet of vehicles. By way of example, a lead vehicle may detect actions by one or more road users at a selected intersection and send information about continuing lane driving operations to the remote assistance workstation 904. In turn, the remote assistance workstation 904 may disseminate the information to other vehicles in the fleet, so that they may alter their routes or modify the models to more accurately predict continuing lane actions by other road users.

In a situation where there are passengers, the vehicle or remote assistance may communicate directly or indirectly with the passengers' client computing device. Here, for example, information may be provided to the passengers regarding current driving operations, changes to the route in response to the situation, etc.

Figure 10:
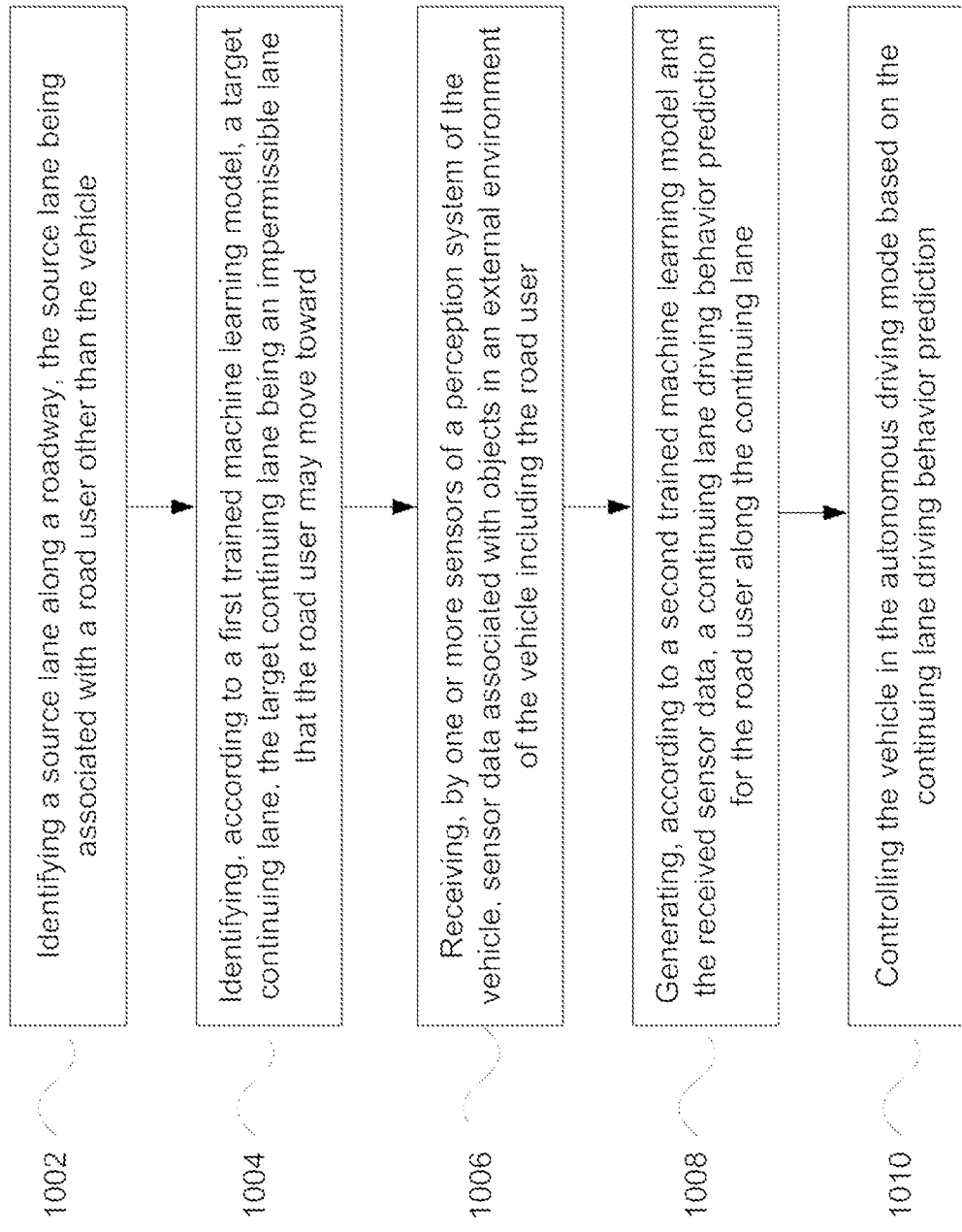
FIG. 10 illustrates an example process in accordance with aspects of the technology.

FIG. 10 illustrates an example process 1000 that is a method of operating a vehicle in an autonomous driving mode. The method at block 1002 identifies a source lane along a roadway, the source lane being associated with a road user other than the vehicle. At block 1004, the method includes identifying, according to a first trained machine learning model, a target continuing lane. The target continuing lane is an impermissible lane that the road user may move toward. At block 1006, the method includes receiving, by one or more sensors of a perception system of the vehicle, sensor data associated with objects in an external environment of the vehicle including the road user. At block 1008, the method includes generating, according to a second trained machine learning model and the received sensor data, a continuing lane driving behavior prediction for the road user along the continuing lane. And at block 1008, the method incudes controlling the vehicle in the autonomous driving mode based on the continuing lane driving behavior prediction.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method of operating a vehicle in an autonomous driving mode, the method comprising:
   identifying, by one or more processors, a source lane along a roadway, the source lane being associated with a road user other than the vehicle;
   identifying, by the one or more processors according to a first trained machine learning model, a target continuing lane, the target continuing lane being an impermissible lane that the road user may move toward, wherein the first trained machine learning model is trained according to one or more source lane features and one or more target lane features, wherein at least one source lane feature or at least one target lane feature includes at least one of a speed limit, lane curvature, lane incline, or lane camber;
   receiving, by one or more sensors of a perception system of the vehicle, sensor data associated with objects in an external environment of the vehicle including the road user;
   generating, by the one or more processors according to a second trained machine learning model and the received sensor data, a continuing lane driving behavior prediction for the road user along the target continuing lane; and
   controlling, by the one more processors, the vehicle in the autonomous driving mode based on the continuing lane driving behavior prediction.

2. The method of claim 1, wherein identifying the source lane includes fetching map information within a curtain radius of a current location of the vehicle.

3. The method of claim 1, wherein identifying the target continuing lane includes identifying a set of possible driving locations exiting from the source lane.

4. The method of claim 1, wherein, prior to controlling the vehicle, the method further includes generating a motion plan for the vehicle based at least in part on the continuing lane driving behavior prediction.

5. The method of claim 4, further comprising, prior to controlling the vehicle, assigning a likelihood to the continuing lane driving behavior prediction.

6. The method of claim 5, further comprising generating one or more continuing lane driving behavior predictions based on the assigned likelihood of the continuing lane driving behavior prediction.

7. The method of claim 1, wherein the target continuing lane either (i) continues straight from a designated turn-only lane, or (ii) makes a turn from a lane that is designated to continue straight only.

8. The method of claim 1, wherein identifying the target continuing lane includes:
   identifying any candidate continuing lanes;
   evaluating all candidate continuing lanes by the first trained machine learning model to identify a score for each candidate continuing lane; and
   evaluating whether the score for a given one of the candidate continuing lanes exceeds a threshold and is higher than the scores for all other candidate continuing lanes.

9. The method of claim 8, wherein when the score for the given candidate continuing lane exceeds the threshold and is higher than the scores for all other candidate continuing lanes, the method includes identifying the given candidate continuing lane as the target continuing lane.

10. The method of claim 8, wherein when the score for the given candidate continuing lane does not exceed the threshold or is not higher than the scores for all other candidate continuing lanes, the method does not identify the given candidate continuing lane as the target continuing lane.

11. The method of claim 1, wherein the first trained machine learning model is further trained according to one or more additional features associated with both a source lane and a target lane.

12. The method of claim 11, wherein the one or more additional features includes at least one of a heading difference between the source lane and the target lane, a distance between the source lane and the target lane, or a lateral distance between the source lane and the target lane.

13. The method of claim 1, wherein generating the continuing lane driving behavior prediction includes:
   running the second trained machine learning model for each candidate continuing lane to identify all candidate continuing lane actions for the road user;
   evaluating all candidate continuing lane actions to identify a score for each candidate continuing lane action; and
   evaluating whether the score for a given one of the candidate continuing lane actions exceeds a threshold and is higher than the scores for all other candidate continuing lane actions.

14. The method of claim 13, wherein when the score for the given candidate continuing lane action exceeds the threshold and is higher than the scores for all other candidate continuing lane actions, the method includes generating the continuing lane driving behavior prediction according to the given candidate continuing lane action.

15. The method of claim 13, wherein when the score for the given candidate continuing lane action does not exceed the threshold or is not higher than the scores for all other candidate continuing lane actions, the method does not generate the continuing lane driving behavior prediction according to the given candidate continuing lane action.

16. The method of claim 1, wherein the second trained machine learning model is trained according to one or more lane features and one or more agent features, the one or more agent features being associated with the road user.

17. The method of claim 16, wherein:
   the one or more lane features includes at least one of a lane heading, a speed limit, lane curvature, lane incline, or lane camber; and the one or more agent features includes at least one of an agent history, a current location, speed, acceleration, heading, use of a turn signal or use of a hazard signal.

18. The method of claim 17, wherein the second trained machine learning model is further trained according to one or more additional features associated with both the lane features and the agent features.

19. The method of claim 18, wherein the one or more additional features includes at least one of a distance between the current location of the road user and the lane, or a difference between the heading of the road user and the heading of the lane.

20. The method of claim 1, wherein the one or more source lane features and the one or more target lane features each include at least one of signage, a traffic light, or an exit point.

21. The method of claim 16, wherein:
the one or more lane features includes at least one of signage, a traffic light, or an exit point; and
the one or more agent features includes at least one of an agent history, a current location, speed, acceleration, heading, or use of a hazard signal.

* * * * *